US012566599B2

(12) United States Patent
Samuel et al.

(10) Patent No.: US 12,566,599 B2
(45) Date of Patent: Mar. 3, 2026

(54) DERIVING MANY IDIOMATIC PROGRAMMING LANGUAGE INTERFACES

(71) Applicant: Temper Systems, Inc., Denver, CO (US)

(72) Inventors: Michael Vincent Samuel, Princeton, NJ (US); Jasvir Nagra, Redwood City, CA (US)

(73) Assignee: Temper Systems, Inc., Denver, CO (US)

( * ) Notice: Subject to any disclaimer, the term of this patent is extended or adjusted under 35 U.S.C. 154(b) by 144 days.

(21) Appl. No.: 18/122,277

(22) Filed: Mar. 16, 2023

(65) Prior Publication Data

US 2023/0325165 A1 Oct. 12, 2023

Related U.S. Application Data

(63) Continuation of application No. 17/342,053, filed on Jun. 8, 2021, now Pat. No. 11,609,753, which is a
(Continued)

(51) Int. Cl.
G06F 9/44 (2018.01)
G06F 8/10 (2018.01)
(Continued)

(52) U.S. Cl.
CPC .................. G06F 8/51 (2013.01); G06F 8/10 (2013.01); G06F 8/31 (2013.01); G06F 8/425 (2013.01)

(58) Field of Classification Search
CPC ........................................................ G06F 8/51
(Continued)

(56) References Cited

U.S. PATENT DOCUMENTS

| | | | |
|---|---|---|---|
| 6,742,175 B1 | 5/2004 | Brassard | |
| 9,557,974 B2 | 1/2017 | Goetz et al. | |
| 10,162,624 B1 * | 12/2018 | Moturu | ............... G06F 9/45529 |

(Continued)

FOREIGN PATENT DOCUMENTS

| | | |
|---|---|---|
| CN | 101438244 A | 5/2009 |
| CN | 107210931 A | 9/2017 |

(Continued)

OTHER PUBLICATIONS

Suman Roychoudhury, "Genaweave: A Generic Aspect Weaver Framework Based on Model-Driven Program Transformation", 2008, p. 1-249, [online][retrieved on Mar. 4, 2025]. Retrieved from <https://gray.cs.ua.edu/pubs/suman-roychoudhury-thesis-2008.pdf>.*

(Continued)

*Primary Examiner* — Evral E Bodden
(74) *Attorney, Agent, or Firm* — NICHOLSON DE VOS WEBSTER & ELLIOTT LLP

(57) ABSTRACT

Computer-implemented techniques for deriving many idiomatic programming language interfaces. The techniques allow a programmer to provide idiomatic interfaces in many different programming languages without extra per-language effort. The techniques provide a solution to technical problems involved in providing idiomatic interfaces in many different programming languages. In particular, the techniques solve the problem of providing idiomatic interfaces that use the different definitional elements required by different programming languages, and in a way that programmers experienced in the language expect.

18 Claims, 16 Drawing Sheets

Related U.S. Application Data continuation of application No. 17/131,574, filed on Dec. 22, 2020, now Pat. No. 11,036,482.

(51) Int. Cl.

| | | |
|---|---|---|
| *G06F 8/30* | (2018.01) | |
| *G06F 8/41* | (2018.01) | |
| *G06F 8/51* | (2018.01) | |

(58) Field of Classification Search

USPC ....................................................... 717/114

See application file for complete search history.

(56) References Cited

U.S. PATENT DOCUMENTS

| | | | | |
|---|---|---|---|---|
| 10,425,531 | B1 | 9/2019 | Liu | |
| 10,732,948 | B2 * | 8/2020 | Singh .................... | G06F 16/254 |
| 11,163,559 | B1 * | 11/2021 | Samuel ..................... | G06F 8/71 |
| 2004/0216044 | A1 | 10/2004 | Martin et al. | |
| 2005/0055682 | A1 | 3/2005 | Gadre et al. | |
| 2007/0283324 | A1 * | 12/2007 | Geisinger ............... | G06F 9/455 |
| | | | | 717/120 |
| 2008/0082556 | A1 | 4/2008 | Schneider et al. | |
| 2010/0037213 | A1 | 2/2010 | Meijer et al. | |
| 2011/0047526 | A1 * | 2/2011 | Olkhovich ................ | G06F 8/00 |
| | | | | 717/104 |
| 2013/0042258 | A1 | 2/2013 | Rector et al. | |
| 2016/0048606 | A1 | 2/2016 | Rubinstein et al. | |
| 2016/0050117 | A1 | 2/2016 | Voellmy et al. | |
| 2016/0140036 | A1 | 5/2016 | O'Meara et al. | |
| 2017/0147302 | A1 | 5/2017 | Goetz et al. | |

FOREIGN PATENT DOCUMENTS

| | | | | |
|---|---|---|---|---|
| CN | 110704040 | A | 1/2020 | |
| CN | 112052006 | A | 12/2020 | |
| CN | 110019464 | B * | 10/2023 | ........... G06F 16/252 |

OTHER PUBLICATIONS

Altassian, "How to Choose the Best Source Code Repository", https://bitbucket.org/product/code-repository, Sep. 30, 2020, 11 Pages.

Gradle, "Publishing a Project as Module", Version 6. 7.1, https://docs.gradle.org/current/userguide/publishing_setup.html, Nov. 28, 2020, 8 pages.

Howto, "Program Library Howto: Shared Libraries", Version 1.20, https://tidp.org/Howto/Program-Library-Howto/shared-libraries.html, Apr. 11, 2003, 8 pages.

International Search Report and Written Opinion, PCT Application No. PCT/US2021/064536, Jun. 2, 2022, 15 pages.

International Search Report and Written Opinion, PCT Application No. PCT/US2021/064536, Sep. 26, 2022, 15 pages.

Kotlin Programming Language version 1.4.21, "JsName", https://kotlinlang.org/api/latest/jvm/stdlib/kotlin.js/-js-name/, last viewed on Dec. 23, 2020, 3 pages including page with concise explanation of relevance.

Notice of Allowance, U.S. Appl. No. 17/131,574, Feb. 18, 2021, 20 pages.

Notice of Allowance, U.S. Appl. No. 17/342,053, Oct. 24, 2022, 19 pages.

Samuel, U.S. Appl. No. 17/135,626, filed Dec. 28, 2020, Office Action mailed Mar. 16, 2021, 15 pages.

Suman Roychoudhury, "Genaweave: A Generic Aspect Weaver Framework based on Model-Driven Program Transformation", PhD Dissertation—University of Alabama, Birmingham, Jan. 1, 2008, 249 pages.

Notice of Allowance, CN App. No. 202180094286.2, Mar. 19, 2025, 5 pages (3 pages of English Translation and 2 pages of Original Document).

Office Action, CN App. No. 202180094286.2, Jul. 17, 2024, 13 pages (7 pages of English Translation and 6 pages of Original Document).

* cited by examiner

| NameUseContext |
|---|
|  |

| FileName |
|---|
| -text    String |

| Name |
|---|
| -useContext    NameUseContext |
| -originalText    String |
| -uniqueId    Int |

DERIVING MANY IDIOMATIC PROGRAMMING LANGUAGE INTERFACES

CROSS-REFERENCE TO RELATED APPLICATIONS

This application is a continuation of U.S. patent application Ser. No. 17/342,053, filed Jun. 8, 2021 (now U.S. Pat. No. 11,609,753 issued Mar. 21, 2023), which is a continuation of U.S. patent application Ser. No. 17/131,574, filed Dec. 22, 2020 (now U.S. Pat. No. 11,036,482 issued Jun. 15, 2021), each of which are hereby incorporated by reference. The Applicant hereby rescinds any disclaimer of claim scope in the prior applications including any disclaimer of claim scope in the prosecution histories thereof.

TECHNICAL FIELD

The present disclosure relates to source-to-source programming language compilers. More specifically, the present disclosure relates to computer-implemented techniques for deriving many idiomatic programming language interfaces.

BACKGROUND ART

Computers are very powerful tools for performing a wide variety of tasks. Computer programs are a common mechanism for accomplishing custom processing tasks using computer systems. A typical program is a set of programmed instructions (source code) that is compiled into an executable form. The executable form is then executed by a computer system to accomplish a task. For example, a set of C programming language instructions may be compiled into a set of x86 processor-executable instructions. The set of processor-executable instructions may then be executed by an x86-compatible processor to accomplish a processing task.

Between the set of programmed instructions as programmed by a human computer programmer and the executable form, a compiler is typically used as a translator. In essence, the compiler shields the programmer from knowing or even caring about underlying executable form details. Typically, all programmed instructions authored by programmers are translated by the compiler. For example, the compiler may perform type-checking, object binding, symbol table construction, register allocation, and instruction scheduling, all without programmer knowledge of the underlying compiler implementation. In this manner, the compiler provides programmers with a tool to reason about and express a processing task at a higher-level using a high-level programming language that alleviates the programmer from the cognitive burden of worrying about low-level execution details. The general construction and operation of compilers is well known in the art. See, e.g., Aho, A., Sethi, R., and Ullman, J.; "Compilers: Principles, Techniques, and Tools," Second Edition, 2007.

One purpose of some compilers is cross-compilation. A cross-compiler may be defined as a compiler that accepts source code that is both human and computer-readable as input and produces multiple different executable forms of the source code as outputs. Consider, for instance, a cross-compiler for the C programming language. Such a cross-compiler might produce from C source code an x86 executable (e.g., for execution on computers configured with the MICROSOFT WINDOWS operating system), an Advanced RISC Machine (ARM) executable (e.g., for execution on mobile computing devices configured with the ANDROID operating system), and a WebAssembly (WASM) executable (e.g., for execution on a virtual stack machine supported by a web browser application).

Source-to-source compilers also exist. A source-to-source compiler may be defined as a compiler that accepts source code that is both human and computer-readable as input. The compiler outputs source code for one or more different source code targets that are also each both human and computer readable. For example, the HAXE compiler can translate source code written in the HAXE programming language into a handful of structurally similar programming language targets. More information on HAXE is available on the Internet in the haxe.org Internet domain.

Source code defines interfaces in a programming language but does not state how the interfaces are to be defined in other programming languages. In other words, an interface definition in one programming language does not tell a source-to-source compiler how the interface is to be defined in another programming language. Rather, a component of the source-to-source compiler sometimes called a backend determines the "plan" or the best method of defining interfaces in the target programming languages. The backend is responsible for translating a programming interface definition in the source programming language into an equivalent interface definition in each target programming language. The role of a backend in a source-to-source compiler is to find an adequate interface definition from a search space of many semantically equivalent alternatives.

Modern source-to-source compilers are focused primarily on whole application development. The set of target programming languages supported by a given source-to-source compiler are typically few and are typically all structurally related. For instance, the HAXE cross-compiler supports JAVASCRIPT, PHP, PYTHON, LUA, C++, JAVA, and C# as programming language targets for web browser, desktop, mobile, server, gaming console, and command line applications.

However, there are issues in scaling to many (e.g., eight or more) programming language targets in current source-to-source compilers. For one, different programming languages use different definitional elements. For example, C++ provides for namespaces, multiply inheriting classes, structs, template functions, defaulting, and overloading; JAVA provides singly inheriting classes, singly-parameterized interfaces, exceptions, and overloading; PYTHON offers classes, union-ing, and exceptions; and JAVASCRIPT offers singly-inheriting classes, objects as namespace, and exceptions. Interfaces generated by a source-to-source compiler for different programming language targets should each use the definitional elements provided by the respective language of the interface.

Another limitation of many current source-to-source compilers for whole application development is that they support only a small number of structurally similar target programming languages. Doing so allows the compilers to provide large source code libraries supporting whole application development. However, the downside of supporting whole application development is that adding support for an additional programming language requires translating the large library to the new programming language. Such translation can make the effort of supporting an additional programming language close to the effort needed to support the second language.

What is needed are techniques for deriving many programming language interfaces. The solution should support all widely used programming languages. In addition, the solution should allow a programmer to generate the interfaces without extra per-target language work. The techniques disclosed herein address this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques are illustrated by way of example, and not by way of limitation, in the figures of the accompanying drawings and in which like reference numerals refers to similar elements and in which:

FIG. 3A, FIG. 3B, FIG. 3C, FIG. 3D, FIG. 3E, FIG. 3F, FIG. 3G, FIG. 3H collectively are a unified modeling language (UML) diagram of interlinguistic definitional element classes and inheritance relationships therebetween.

SUMMARY OF THE INVENTION

Figure 1:
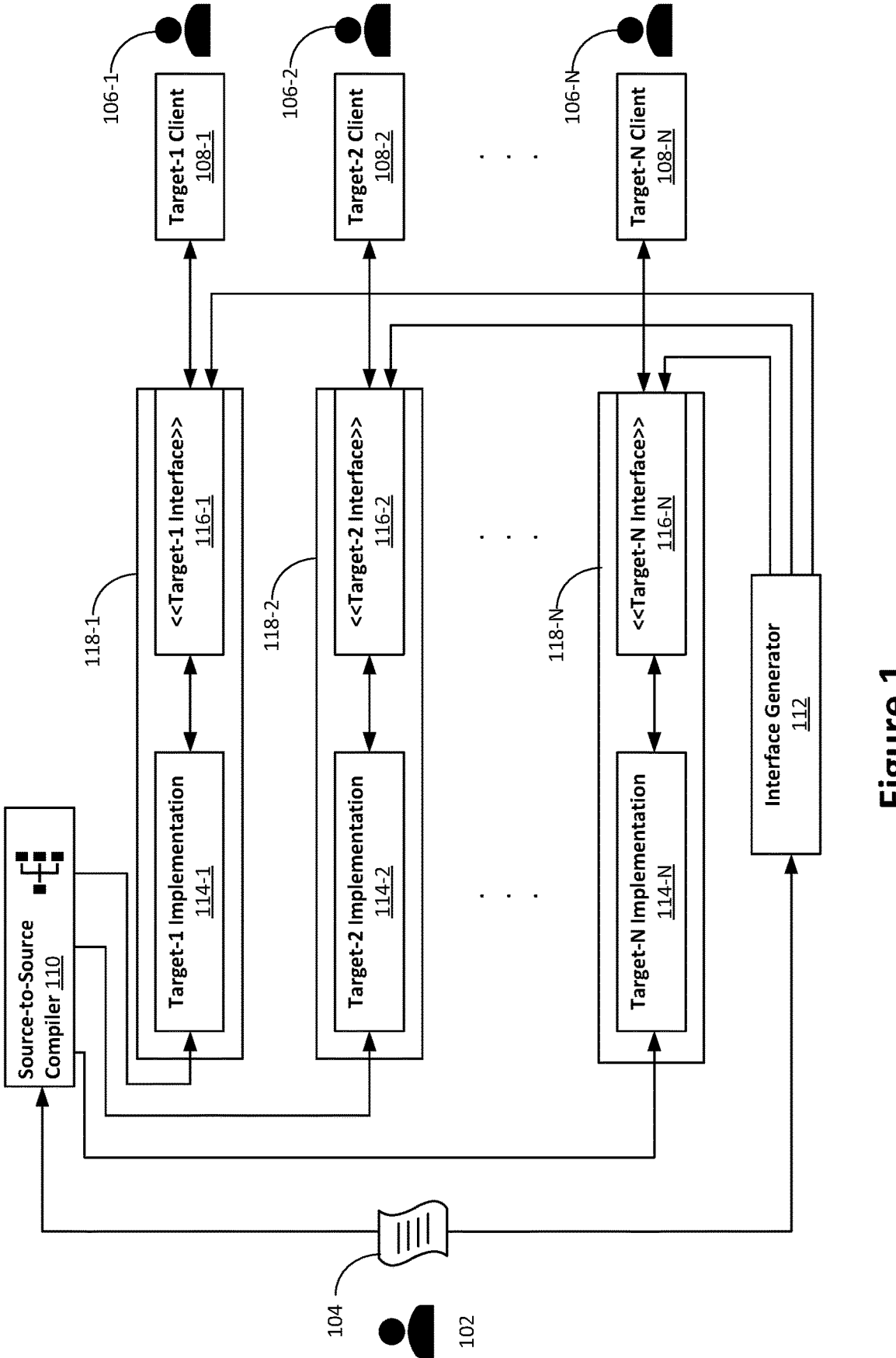
FIG. 1 depicts an organizational view of deriving many idiomatic programming language interfaces.

The General Overview section of the Detailed Description below provides a useful overview of the techniques for deriving many idiomatic programming language interfaces.

In some embodiments, an interface generator uses a model of how definitional elements can combine to craft an interface for a compiler input or output. The model may involve constraints as in constraint programming or rules as in a rule-based system or expert system.

In some embodiments, the model incorporates a formal grammar. The formal grammar can be generative, for a programming language that resembles the target programming language, or for a language that includes interlinguistic definitional elements that correspond to those available in many target programming languages or which can be translated to those available in a target programming language.

In some embodiments, the formal grammar is driven to produce alternatives. A search algorithm or a goal-directed planning algorithm may be used to may be used to drive the grammar.

In some embodiments, a model of how definitional elements can combine to craft an interface for a compiler input or output is used to filter or improve possibly invalid combinations of definitional elements.

In some embodiments, a model of how definitional elements can combine to craft an interface for a compiler input or output uses a plugin architecture. The plugin architecture may be used to allow custom naming, to allow a custom name collision resolving strategy of last resort, to allow customizing translation of a feature to definitional elements, to allow the way interface elements connect to functional elements, or to adjust portions of a compiler input or output. Portions of a compiler input or output may be done because a target programming language does not allow to different names for the same thing such as, for example, a hidden name that arises when a type definition is compiled to a functional element, and another, public name assigned by the interface generator. The plugin architecture may encompass implementing default behavior of the interface generator via one or more base plugins. The interface generator may then delegate certain tasks to base plugins.

In some embodiments, a model of how definitional elements can combine to craft an interface for a compiler input or output is input to an artificial intelligence technique that evolves a valid and complete combination of definitional elements based on possibly invalid or incomplete precursors.

In some embodiments, a model of how definitional elements can combine to craft an interface for a compiler input or output includes placeholders that can be filled with names or identifiers suppled as the mode is evaluated or thereafter. The placeholders may be related to names or identifies associated with functional elements or derived from a compiler input. The placeholders may include metadata specifying that a kind of name is preferred. The metadata may include human part-of-speech tags such as noun phrase preferred, or interrogative phrase preferred. The metadata include information about preferred text casing. The metadata include information preferred term-combing style such as, for example, lowerCamelCase, UpperCamelCase, under_scored, etc. Portions of the metadata may be references to data that is not stored in the model itself. For example, the metadata may include a reference to an algorithm.

In some embodiments, the interface generator uses a corpus of models of how definitional elements can combine to craft interfaces for compiler inputs or outputs. A description of a target programming language may be used to identify an appropriate model for a given target programming language. For example, the description might be "C++." A description of compiler inputs or outputs may be used to find an appropriate model for a given target programming language. For example, filenames ending ".java" or ".class" indicate that a JAVA model should be used. A machine learning classifier may be applied to compiler inputs or outputs to select a model. The corpus of models may include multiple models for many target programming languages (e.g., eight or more models for eight or mode target programming languages.)

In some embodiments, the interface generator is used in conjunction with a cross-compiler that produces outputs for multiple target programming languages.

In some embodiments, a compiler invokes the interface generator.

In some embodiments, the interface generator is applied separate from a compiler. The interface generator may be applied to a compiler input before compilation. The interface generator may supply outputs that are then also inputs to a compiler. The interface generator may be applied after compilation and then the same compiler or a different compiler may be applied to outputs of the interface generator. Outputs from a compiler and the interface generator may be routed through a stand-alone linker.

In some embodiments, an interface is derived from a group of functional elements. A functional element may be represented as a bundle of data. The data may include a descriptive name useful for debugging. The data may include a reference to part of a compiler input useful for debugging. The data may include a definitional element in an interlinguistic definitional element language. The data may include a reference to part of a compiler input or compiler output to aid connecting definitional elements generated by the interface generator related to this functional element to computational machinery that performs a task of the functional element.

In some embodiments, functional elements are grouped into functional sets. Evaluation of functional elements may be based on whether each functional set has an element that corresponds to a generated definition. Functional elements may be grouped into sets based on aspects of a compiler input or a compiler output. Metadata in a common specification may specify which functional sets a functional element is in. The metadata may be specially formatted source code comments or annotations that specify which functional sets a functional element belongs to. The source programming language of the common specification may include specific mechanisms for definition functional sets including definitional elements and macros. A naming convention or lexical scoping may be used to relate functional elements and functional sets. Functional elements may be grouped into sets based on aspects of separate metadata such as information in a data file in source code revision control, build system declarations at a programmer's workstation, or in a separate database. Functional elements may be found by scanning compiler input, compiler output, the common specification, or separate metadata. A model for a target programming language may include rules that determine which combination of functional set elements complete a set such as, for example, if a target has multiple integer types for differing machine size (e.g., 8-bit, 16-bit, 32-bit, 64-bit, etc.). Alternatively, a target model may specify how to duplicate functional elements for each of a set such as, for example, creating 8-bit, 16-bit, 32-bit, and 64-bit integer variants when the target so requires. As yet another alternative, a functional element may have metadata attached that allows filtering or coalescing in conjunction with a target model. For example, one target may need to support both 32-bit and 64-bit numbers to be functionally complete with another target may need to support only 64-bit numbers to be functionally complete.

In some embodiments, an interface definition is separately translated from a feature and merged into a larger more complete definition. The decision to merge two interface definitions and what to merge them into may be based on surrounding contextual envelope elements.

In some embodiments, a portion of an interface definition is hoisted into a containing element. The decision to hoist may be defined based on metadata attached to the definition. The decision to hoist or the level to which to hoist may be based on the kind of interface definition. The decision to hoist or the level to which to hoist may be based on information contained in a target model.

In some embodiments, the interface generator is configured to preserve backwards-compatibility requirements. A stabilizer component of the interface generator may collect stability requirements. The stability requirements collected may be metadata produced by a previous run of the interface generator. That metadata may be produced by the interface generator or by a programmer in a human and machine-readable format that could be produced by interface generator. The metadata may be found in a compiler output or a bundle of compiler outputs. The metadata may be fetched across the network from a common module repository. One or more clients of a previous version may be examined to find what functional elements are actually used. One or more potential future clients may be examined to find what functional elements they will use. This may involve scanning source code files in a target programming language or examining compiler errors looking for "XYZ not provided" messages and then inferring what is needed. The stability requirements may be automatically derived from compiler outputs, such as when migrating a library where previous versions used manually produced interface to a tool-chain that includes an automatic interface generator. The interface generator may output information for the stabilizer to use in the future. The information may be emitted a metadata file. The metadata file may live alongside compiler inputs in revision control, stored in a database of version metadata, or bundled alongside compiler outputs. The information may be embedded in a compiler output or alongside one or more compiler outputs in a bundle. The information may be patched into a compiler input such as, for example, as annotations or structured comments or by replacing or augments previous annotations or structured comments. In some embodiments, source code compatibility requirements are treated separately from binary compatibility requirements.

In some embodiments, a model of a human language is used to avoid conflicts or to produce more idiomatic names. The model may specify a verb phrase, a noun phrase, or an interrogative phrase that is preferred. The model may include or reference a thesaurus or stemmer to swap between names. The model may include or reference a diction of acronyms preferred by a target. For example, JAVA prefers Uniform Resource Identifier (URI) by JAVASCRIPT prefers Uniform Resource Locator (URL). The model may include or reference a segmenter to break words and a word recombiner according to camel casing or underscoring preferences. In some embodiments, top-level name conflicts are resolved by search repositories. The model may include or reference an affixer to resolve name conflicts by attached particles to names. The affixer may be proactive to avoid future name compatibility problems. Decisions or unresolve name conflicts may be presented to a human for adjustments or approval such as in a graphical or text-based computer user interface.

In some embodiments, machine learning is used to derive a target model or a name based on training examples of interfaces. For example, machine learning may be used to derive a target model for a new target programming language or a new dialect of an existing target programming language.

In some embodiments, a mechanism takes interface definitions and connects them to functional elements. Such connection may happen before compilation of the connected interface definitions and functional elements. Such connection may include generating source code, invoking a third-party compiler or linker, generating binary instructions or bytecode, consuming a bundle of compiler outputs, or producing a bundle of compiler outputs. Such connection may also involve presenting connection machinery to a programmer for approval or adjustments before processing such as in a graphical or text-based computer user interface.

DETAILED DESCRIPTION

In the following description, for the purposes of explanation, numerous specific details are set forth to provide a thorough understanding of the techniques. It will be apparent, however, that the techniques may be practiced without these specific details. In other instances, well-known structures and devices are shown in block diagram form to avoid unnecessarily obscuring the techniques.

General Overview

Computer-implemented techniques are described herein for deriving many idiomatic programming language interfaces from a common specification. The techniques allow a programmer to provide idiomatic interfaces in many different programming languages without extra per-language effort. The techniques provide a solution to technical problems involved in providing idiomatic interfaces in many different programming languages. In particular, the techniques solve the problem of providing idiomatic interfaces that use the different definitional elements required by different programming languages, and in a way that programmers experienced in the language expect.

The techniques described herein may be computing systems, computer-implemented methods, or non-transitory storage media, and include obtaining a set of one or more features extracted from a common specification. For each programming language target of many programming language targets, an interlinguistic definitional element model for the programming language target is applied to the set of features. The model is applied to generate a set of interlinguistic definitional elements from the set of features and for the programming language target. The set of interlinguistic definitional elements are then translated to an idiomatic interface definition for the set of features and the programming language target.

These and other aspects of the techniques will become apparent from the following detailed description in combination with the accompanying drawings, illustrating, by way of example, the principles of the techniques.

Glossary

The following definitions are provided for illustrative purposes, not limitation, to aid in understanding of the disclosure of the techniques:

Client: A "client" may be defined as part of a system that delegates a task to a library.

Compiler: A "compiler" consumes an input suitable for both human and machine consumption, such as a program written in a programming language, and produces an output more suitable for machine consumption.

Cross-Compiler: A "cross-compiler" is a compiler that produces two or more outputs from one input.

Definitional Element: A "definitional element" may be defined as a building block of a programming language provided by the language for crafting an interface in the programming language. Different languages provide different sets of definitional elements for crafting interfaces.

Feature: A "feature" may encompass one or more lexical tokens extracted from common specification that form a syntactically allowable source programming language construct that is to be made available to clients in libraries as corresponding syntactically allowable constructs in many target programming languages.

Functional Element: A "functional element" may be defined as a portion of a compiler output that programmers maintaining a compiler input would like to allow a client to use.

Interface: An "interface" may be defined as how a client connects to a library. An interface may include one or more interface definitions connected to portions of a compiler output.

Interface Definition: An "interface definition" may be defined as a group of definitional elements in a programming language that are sufficient to allow a client to use a functional element.

Interlinguistic Definitional Element: An "interlinguistic definitional element" may be defined as a building block for crafting from one or more features of an interface in many different programming languages.

Library: A "library" may be defined as the expression of an algorithm or algorithms in an automatable form. An example of an automatable form may be programming language code or a compiled version thereof (e.g., as bytecode, binary-executable code, etc.). Typically, when executed as a process or processes, the library does not "own" the process(es) of which it executes as a part of. Instead, a library executes alongside or as part of a larger system that delegates specific kinds of algorithmic tasks to the library. For example, a microservice on a computer network may be viewed as a library. Microservices often exist for other network nodes to delete specific algorithmic tasks to.

Target: A "target" may be defined as a mechanism used by a client to connect to a compiler output. A programming language can be a target; a programmer writes code to connect to a library that loads into the same memory space. A virtual machine (VM) can be a target; a programmer can write code that compiles to the kind of bytecode that the virtual machine runs and rely on the VM to link uses via the interface. Another program may be a client. Accordingly, inter-program mechanisms are targets; code may use inter-process communication (IPC), remote procedure calling (RPC), or RESTful network protocols to send a message to something running outside the client program's process such as, for example, a network service or a microservice, and recognize when an incoming message contains a response.

Type: A "type" is a definitional element that serves to explain which kinds of values fit where. For example, a definitional element may use a numeric type in one way to indicate that it expects a number (numeric value) as input and in another to indicate that it produces a number as output.

Example Use Case

Consider, for example, a use case of the techniques in a large software-development organization that has many specialized teams of software engineers and data scientists. For example, the organization may have a mobile application development team of engineers, a web application development team, and a data science team. Each of these teams may use different programming languages and related technologies. And across all teams, many different programming languages may be used (e.g., eight or more). Inevitably, each of these teams will have common problems that need to be solved. A common problem may be related to business requirements that do not pertain to or require any particular programming language or technology.

One possible organizational approach to solving organization-wide problems is to have each team separately solve the problem using the programming languages and technologies that they respectively are most comfortable with. In addition to duplicated efforts, this approach has other issues. For one, due to the siloed nature of the teams and the respective different programming languages and technologies each team uses, the possibility for code sharing across teams is limited to nonexistent. Further, if each team silo separately translates the business requirements of the common problem, then the result can be multiple low-quality, subtly different, and inconsistently maintained solutions.

In contrast, a common infrastructure team using the techniques disclosed herein can develop a solution for all other teams including providing the solution in the respective programming languages that the teams are experienced and familiar with. In particular, members of the common infrastructure team can author a source code specification embodying a solution to the common problem in a single source computer programming language. Thus, the members need only be experts in the source computer programming language and do not need to be experts in many computer programming languages.

At a high-level, once the source code specification has been authored, then, according to the techniques disclosed herein, an interface generator extracts a set of features from the common specification. For each desired target programming language, the interface generator applies an interlinguistic definitional element model for the target language to the set of features to generate a set of interlinguistic definitional elements from the set of features and for the target language. For example, if there are ten target languages, then up to ten interlinguistic definitional element models may be applied to the set of features. Each generated set of interlinguistic definitional elements is then translated by the interface generator into an idiomatic interface definition in a target language.

The idiomatic interface definitions along with libraries implementing the interfaces generated by a source-to-source compiler may then be provided to the other teams in the organization for integration into their projects. Beneficially, using the techniques, a solution to the common organizational problem is solved centrally and distributed to different teams in different programming languages that the different teams respectively are familiar and comfortable working with. Further, due to the centralized organizational process enabled by the techniques, the aforementioned problems with having each team separately solve the common problem within their own team silos are reduced or eliminated.

Example System

FIG. 1 which depicts an organizational use case of deriving many idiomatic programming language interfaces. The common infra-structure team example is discussed throughout herein. However, numerous other use cases of the techniques are possible. For example, a software developer or programmer in a community of developers or programmers can develop a solution in the source programming language and then use the techniques to create versions of the solution in many different programming languages which the developer can then publish to various online source code repositories such as GITHUB, BITBUCKET, GITLAB, SOURCEFORGE, or the like.

Returning to the organizational use case, at the outset, a human programmer 102 in a common infra-structure team programs (authors) a common specification 104 in a source programming language. Common specification 104 is suitable for input to source-to-source compiler 110 and interface generator 112. Common specification 104 defines an implementation of an algorithm that provides a solution to a shared organizational problem and also declares an interface therefore according to the source programming language and in a form that is both human and computer readable.

Once programmed, common specification 104 is translated (compiled) by source-to-source compiler 110 into many target implementations 114-1, 114-2, . . . 114-N of the algorithm in many different target programming languages. For example, the target programming languages may encompass widely used languages such as, for example, all the following programming languages, a subset of these languages, or a superset thereof: C, JAVA, PYTHON, C++, C #, JAVASCRIPT, PHP, SWIFT, R, LISP, FORTRAN, ADA, PASCAL, GROOVY, RUBY, GO, OBJECTIVE-C, DART, SCALA, and LUA.

Common specification 104 is also translated (compiled) by interface generator 112 into many target interfaces 116-1, 116-2, . . . 116-N. A target interface and target implementation pair when connected togethers forms a target library in a target programming language that is available for use by a target client. In the example of FIG. 1, target library 118-1 is composed of target-1 interface 116-1 connected with target-1 implementation 114-1, target library 118-2 is composed of target-2 interface connected with target-2 implementation 114-2, . . . target library 118-N is composed of target-N interface 116-N connected with target-N implementation 114-N. For example, target library 118-N may be JAVA source code library, target 118-2 may be a PYTHON source code library, . . . target 118-N may be a C++ source code library.

Target clients 108-1, 108-2, . . . 108-N may be computer programs programmed in the target languages by respective human programmers 106-1, 106-2, . . . and 106-N. For example, programmer 106-1 may be on the organization's enterprise software team that programs target-1 client 108-1 in the JAVA programming language. Continuing the example, programmer 106-2 may be on the organization's data science team that programs target-1 client 108-2 in the PYTHON programming language, and programmer 106-N may be on the organization's embedded systems team that programs target-N client 108-N in the C++ programming language.

It should be noted that target clients 108-1, 108-2, . . . 108-N may be programmed to accomplish completely different tasks. For example, target-1 client 108-1 may be programmed to accomplish an enterprise software task, target-2 client 108-2 a data science task, and target-N client 108-N an embedded systems task. Nonetheless, target clients 108-1, 108-2, . . . 108-N may require common functionality provided by target libraries 118-1, 118-2, . . . 118-N in different programming languages. For example, the common functionality may be dictated by business requirements of the organization such as for information security or privacy compliance, or simply base functionality that many target clients require.

Target clients 108-1, 108-2, . . . 108-N can respectively connect to target implementations 114-1, 114-2, . . . 114-N of target libraries 118-1, 118-2, . . . 118-N via target interfaces 116-1, 116-2, . . . 116-N of target libraries 118-1, 118-2, . . . 118-N. In particular, target-1 client 108-1 can connect to target-1 implementation 114-1 via target interface 116-1, target-2 client 108-2 can connect to target-2 implementation 114-2 via target interface 116-2, . . . target-N client 108-N can connect to target-N implementation 114-N via target interface 116-N.

The connection between a target client and a target interface may be made via the Application Programming Interface (API) of the target interface generated in the target programming language by interface generator 112. In particular, interface generator 112 employs techniques described herein for generating APIs in many target programming languages that developers in a particular target language would recognize as idiomatic. For example, if the target programming language of target library 118-1 is JAVA, then programmer 106-1, as a representative member of the community of JAVA programmers, may recognize the API of target-1 interface 116-1 as idiomatic for the JAVA programming language; if the target programming language of target library 118-2 is PYTHON, then programmer 106-2, as a representative member of the community of PYTHON programmers, may recognize the API of target-2 interface 116-2 as idiomatic for the PYTHON programming language, . . . if the target programming language of target library 118-N is C++, the programmer 106-N, as a representative member of the community of C++ programmers, may recognize the API of target-N interface 116-N as idiomatic for the C++ programming language.

Alternative Targets

A programming language is one example of a target. However, the techniques are not limited to programming language targets. More broadly, a target may be defined as a mechanism used to connect to a compiler output (e.g., a target implementation of a target library). With this broader view, a virtual machine (VM) or an inter-process communication (IPC) mechanism can be a target.

In the virtual machine case, common specification 104 can include source programming language instructions which are compiled by source-to-source compiler 110 into target implementations 114-1, 114-2, . . . 114-N for different target virtual machine platforms. For example, a target implementation may contain a byte-code translation of common specification 104 that is interpretable or executable by a particular target virtual machine platform. Also in the virtual machine case, interface generator 112 can generate target interfaces 116-1, 116-2, . . . 116-N (e.g., linking interfaces) for the different target virtual machine platforms that allow the respective platforms to connect to (e.g., link to) the corresponding target implementation.

In the inter-process communication (IPC) case, common specification 104 can include source programming language instructions which are compiled by source-to-source compiler 110 into target implementations 114-1, 114-2, . . . 114-N for different programming languages. The source programming language instructions can also be processed by interface generator 112 into target interfaces 116-1, 116-2, . . . 116-N for the different target programming languages. However, target libraries 118-1, 118-2, . . . 118-3 may execute as a network service or a micro-service or the like. In this case, instead of target clients 108-1, 108-2, . . . 108-N connecting to target libraries 1118-1, 118-2, . . . 118-3 via APIs, target clients 108-1, 108-2, . . . 108-N may connect to target libraries 1118-1, 118-2 . . . 118-3 executing as network services or micro-services via a network remote procedure call (RPC) protocol or the like such as, for example, Representational State Transfer (REST), Simple Object Access Protocol (SOAP), extensible Markup Language (XML)-RPC XML RPC, JSON-RPC, or the like.

Example Source Programming Language

Source-to-source compiler 110 and interface generator 112 may each have a frontend component for parsing and processing common specification 104 in the source programming language and to produce an intermediate representation thereof for further processing by backends. There may be a backend for each target programming language of N target programming languages supported.

Each backend may be responsible for generating a respective target implementation (in the case of source-to-source compiler 110) and a respective target interface (in the case of interface generator 112) in the respective target programming language. The target implementation and the target interface may be generated from the intermediate representation produced by a frontend. Along with associated metadata, the intermediate representation may encompass an abstract syntax tree (AST)-based representation or a byte-code-based representation, as two examples.

For example, source-to-source compiler 110 may have a first backend for generating target implementation 114-1 in the JAVA programming language, a second backend for generating target implementation 114-2 in the PYTHON programming language, and a third backend for generating target implementation 114-N in the C++ programming language. Likewise, interface generator 112 may have a first backend for generating target interface 116-1 in the JAVA programming language, a second backend for generating target interface 116-2 in the PYTHON programming language, and a third backend for generating target interface 116-N in the C++ programming language. While in this example, only three target programming languages are mentioned, the source programming language, source-to-source compiler 110, and interface generator 112 is specifically designed to support many programming languages such as, for example, all widely used programming languages. In that case, N may number into the tens, twenties, thirties, or more.

While in some implementations source-to-source compiler 110 is a separate and distinct component from interface generator 112, in other implementations source-to-source compiler 110 and interface generator 112 are integrated in the same component. In these cases, source-to-source compiler 110 and interface generator 112 may share the same frontend and backend components.

The source programming language may be a general-purpose language supporting various programming language constructs. To support source-to-source compilation for many target programming languages, the source programming language may have various characteristics that support flexibility of source-to-source compiler 110 and interface generator 112 to translate common specification 104 in source programming language to many different target programming languages and to accommodate various differences that exist across widely used target programming languages.

As an example of some of the differences across widely used languages, while many widely used target programming languages have managed memory capabilities such as garbage collection, some do not (e.g., the C programming language). As another example, there is no common concurrency mechanism such as threading that is available across widely used target programming languages. As yet another example, character strings are represented differently (e.g. Unicode Transformation Format (UTF)-8, UTF-16, or UTF-32) by different languages such that the atomic units for randomly-accessing characters in a string efficiently (e.g., in O (1) time) are different sizes (e.g., one, two, or four bytes) for different languages. Some target programming languages provide soundness or safety guarantees that others do not. For example, a program programmed in the JAVA language will raise an exception if there is an attempt to access data beyond the bounds of an array. However, a program in the C language provides no such protection. As another example, some languages provide protection against integer overflow and underflow, while others do not. Different target languages can have different semantics for the same simple syntax. For example, the semantics of 'x+1' and 'x<y' differ across target languages. Different target languages can use the same keywords (e.g., 'class' and 'type') but with different meanings. Different target languages have different community standards as to what is considered good programming style. Different target languages provide different mechanisms for expressing error conditions (e.g., by return value, by global error codes, or by exceptions).

The characteristics of the source programming language can support these variances among the target programming languages.

Source Programming Language— Values

When generating the intermediate representation of common specification 104, a frontend of source-to-source compiler 110 or interface generator 112 may need to communicate information to the backends about when values (e.g., variable values) programmed in common specification 104 can be assumed to conform to types available in a target programming language or are otherwise eligible for certain operations available in the target programming language.

Source Programming Language— Integer Values

Integer types in the source programming language may be based on arbitrary precision arithmetic, also known as "bignum." This allows the source programming language to interoperate with the native data types of various backends. In particular, this allows the source programming language to interoperate with all of: JAVASCRIPT's 51 bits of integer arithmetic, PYTHON's and RUBY's native bigint, Objective Categorical Abstract Machine Language (OCAML)'s integer types, most other target language's 32-bit native integer types and signed or unsigned integer types in those target languages that support them.

A backend for a given target programming language may need to determine whether a given numeric value programmed in common specification 104 can fit into a fixed-size native number representation (e.g., a 32-bit or a 64-bit representation). In this case the backend can use the fixed-size native number representation to represent the value in the target programming language.

As another example, a backend may need to determine whether a given string value programmed in common specification 104 can be assumed to be a randomly accessible sequence of one of UTF-8, UTF-16, or UTF-32 code units. In the case where the source programming language uses the same code unit size as a target language, the backend for the target language can likely directly map the string value to a string data type in the target programming language.

To support accurate, high throughput parsing of complex, nested languages like HyperText Markup Language (HTML)/JS/URI that use different size code units, the source programming language may provide buffer types that are not accessed by index, but by cursors. Since cursors are not forgeable by arithmetic, a UTF-xx cursor is guaranteed to fall on a UTF-xx code-unit boundary.

The use of buffer types by the source programming language also supports the source programming language's approach to concurrency. In particular, one coroutine may have a read buffer view and another a write buffer view of the same shared region of memory.

Where non-linear access to a buffer is desired such as when processing binary data (e.g., image data), the source programming language can treat binary format processing as a special kind of non-string buffer where a cursor can be created from a number.

As yet another example, a backend may need to determine whether all values of a composite data type (e.g., like a class or struct) declared in common specification 104 each have a fixed upper bound on their size that can be determined by the frontend based on the declaration of the values in common specification 104. In such a case, the backend for a target language may allocate the values on the stack, heap, or data segment according to the optimal allocation strategy determined by the backend.

As yet another example, a backend for a target language may need to determine whether a value can be passed-by-value or passed-by-reference. For example, consider a non-address pointing value (non-pointer value) that is passed to a function in a function call but is not modified by the receiving function as programmed in common specification 104. In this case, the backend for a target language may be able to select between passing the value by reference or passing it by value as best suited for the target language.

The intermediate representation produced by a frontend may include information for a backend to make one or more of the above example determinations.

Source Programming Language— Lifetime Reasoning

A backend for a target language that supports closure conversions may need to determine if a value defined in a function as programmed in common specification 104 will be needed at runtime after that function completes. If it will not be needed, then the backend may have a greater number of options with respect to closure conversions of the function. Further, if the value will not be needed at runtime after the function completes, then a pointer to the value's location on the stack can be safely passed to other functions called from within the function.

The intermediate representation produced by a frontend of source-to-source compiler 110 or interface generator 112 may include information for a backend to make this determination.

Source Programming Language— Deallocation

The source programming language may support deallocation. For memory-safe target languages, a value stored on the stack or heap should be de-allocated exactly once at runtime and not before its last use. For memory-unsafe target languages (e.g., the C programming language), the source programming language should support programmers working separately to collaborate on programs that deallocate values exactly once and not too early.

Both memory-safe and memory-unsafe target languages may be supported by the source programming language by using a type system that requires an acyclic object graph. This allows reference counting to be sufficient for timely (not too early) and safe (exactly once) de-allocation of values on the stack and heap. For target programming languages that support garbage collection, values programmed in common specification 104 can be allocated by a backend for such a target language in a garbage collected memory region. For target programming languages that do not provide for garbage collection, a backend can implement reference counting semantics for the values.

Source Programming Language— Concurrency Safety

Many target languages support multi-word values (e.g., values larger than 32 bits). In this case, some of these target languages support multi-word values by splitting writes of the values to processor registers or memory at runtime into multiple, separate single word writes. For example, a write of 64-bit value may be split at runtime into two single 32-bit writes. Multi-word reads may be split likewise.

Without concurrency control, if two parts (e.g., two threads) of a computer program programmed in a target language are running concurrently, and one is writing one word of a multi-word value while another starts reading the multi-word value, then the reader might obtain a portion of the prior multi-word value mixed with a portion of the new multi-word value, which is neither the entire prior multi-word value nor the entire new multi-word value. Such a read mostly likely will result in the computer program behaving unexpectedly if not failing (crashing) altogether. As such, the source programming language may support coroutines for separating work into subtasks that can be safely executed concurrently and allow the programmer of common specification 104 to guard against the race condition problems like the multi-word one just described above.

To support concurrency-safety, the source programming language may allow the programmer of common specification 104 to create a mutable instance of a class type from which an immutable equivalent can be derived. The immutable equivalent can be safely operated on concurrently at runtime. For example, consider the following class definition:

```
00:        class Point {
01:            x: Int;
02:            y: Int;
03:        }
```

Following this definition, common specification 104 can create an instance of a Point as follows:

00: let p=new Point {X: 10, y: 20};

And since the instance p is mutable, common specification 104 could adjust the instance as follows:

01: p.x+=1;

Common specification 104 can return the instance p as immutable for concurrency safety as follows:

02: return p as Immutable;

Source Programming Language— Memory Safety

In many target languages, a pointer or reference to an object in memory can typically only point or refer to the start or beginning of the object as allocated in memory. However, other programming languages (e.g., C) allow for so-called split-pointers. A split-pointer can point or refer to the start, middle, end or even beyond the boundaries of an allocated object. For example, a programmer can author a C program that performs pointer arithmetic. While split-pointers can be useful and efficient for certain operations, if they are not programmed correctly, then they are not memory safe. For example, an incorrectly programmed split-pointer can cause a program to fail or crash at runtime. For memory-safety, the source programming language may not support split-pointers.

Source Programming Language— Global Variables

The source programming language may not allow arbitrary types for global variables. Instead, global variables are either: (a) initialized at runtime before the first read on load of a module or file, or (b) one of a predefined set of concurrency-safe data types. By doing so, the source programming language can use reference counting for most data types, and use atomic reference counting where concurrency is needed, while also allowing a JAVA backend or another like backend to leverage types like JAVA's AtomicLong type or ConcurrentHashMap type for global variables.

Source Programming Language— Inheritance

Some target languages are object oriented. Such languages typically allow for inheritance through a class and subclass mechanism or the like. For example, a subclass of the following C++ class could inherit state (e.g., the value of int x) and behavior (e.g., the implementation of the get( ) function).

```
00:        class C {
01:            int x;
02:            public int get( ) { return x; }
03:        }
```

Some object-oriented target languages allow for single inheritance of both state and behavior. Some object-oriented target languages allow for multiple inheritance of behavior but permit only single inheritance of state. For example, the JAVA programming language provides interfaces to support multiple inheritance of behavior and classes to support single inheritance of both state and behavior.

To support both object-oriented and non-object-oriented target languages, the source programming language may support code reuse and single and multiple inheritance of behavior through traits. However, the source programming language may not support inheritance of state due to the semantic differences between superficially similar programming language constructs across different object-oriented languages. For example, some object-oriented languages support the concept of constructor chaining but with different semantics. As another example, some object-oriented languages support the concept of information hiding but again with different semantics.

Source Programming Language— Function Overloading

Some target languages support function overloading. For example, in the JAVA programming language, a programmer might define two functions with the same name but which declare distinct input types for formal parameters of the functions as in the following example:

```
00:        class Foo {
...
01:            void say(String message) { ... }
02:            void say(int i) { ... }
...
03:        }
```

In the above example, a call to say("some string") elsewhere in a JAVA program can be matched at compile time to the proper say( ) function through function signature matching. In particular, in this example, since the call to say( ) passes a String type as the argument, a JAVA compiler can determine that the say(String message) function should be invoked by the call at runtime as opposed to the other say function that accepts an integer as the input parameter.

On the other hand, the above function overloading that is possible with the JAVA programming language, is not possible with other languages (e.g., JAVASCRIPT). In this case, the programmer may explicitly program runtime type matching into a function as in the following JAVASCRIPT example:

```
00:        function say(message) {
01:            if (typeof message === 'string') {
...
02:            } else if (typeof message === 'number') {
...
03:            } else {
04:                throw new Error(input);
05:            }
06:        }
```

To support both target languages that support function overloading and those that do not, the source programming language may support umbrella functions which are a kind of multimethod that allows a frontend to group similar named functions together so that backends can produce the kind of code that is most appropriate and to take advantage of any function overloading capability of a target programming language.

To support runtime "function overloading" in the target languages that do not provide for compile-time function overloading, function calls may be handled in the source programming language by umbrella functions. An umbrella function may collect a set of functions with the same calling convention. At runtime, an umbrella function may be called (invoked) in two stages: first, the umbrella function may perform tests on its arguments to select one of the actual functions, methods, or procedures it collects, and second, the selected function, method, or procedure is called, and its result is used as the result of the umbrella function invocation. Since the umbrella function may only do a limited number of tests in the first stage, it may be possible for a backend for a particular call to narrow down based on type information, the number of possible covered functions that might be picked to one. Backends for target languages that do support compile-time function overloading (e.g., JAVA) may attempt to predict, for a particular call, the function that an umbrella function would pick at runtime and translate the particular call to the predicted function. For backends for target languages that do not support compile-time function overloading (e.g., a backend for JAVASCRIPT), these backends may compile the umbrella function to one function that performs both stages.

Interface Generator

Figure 2:
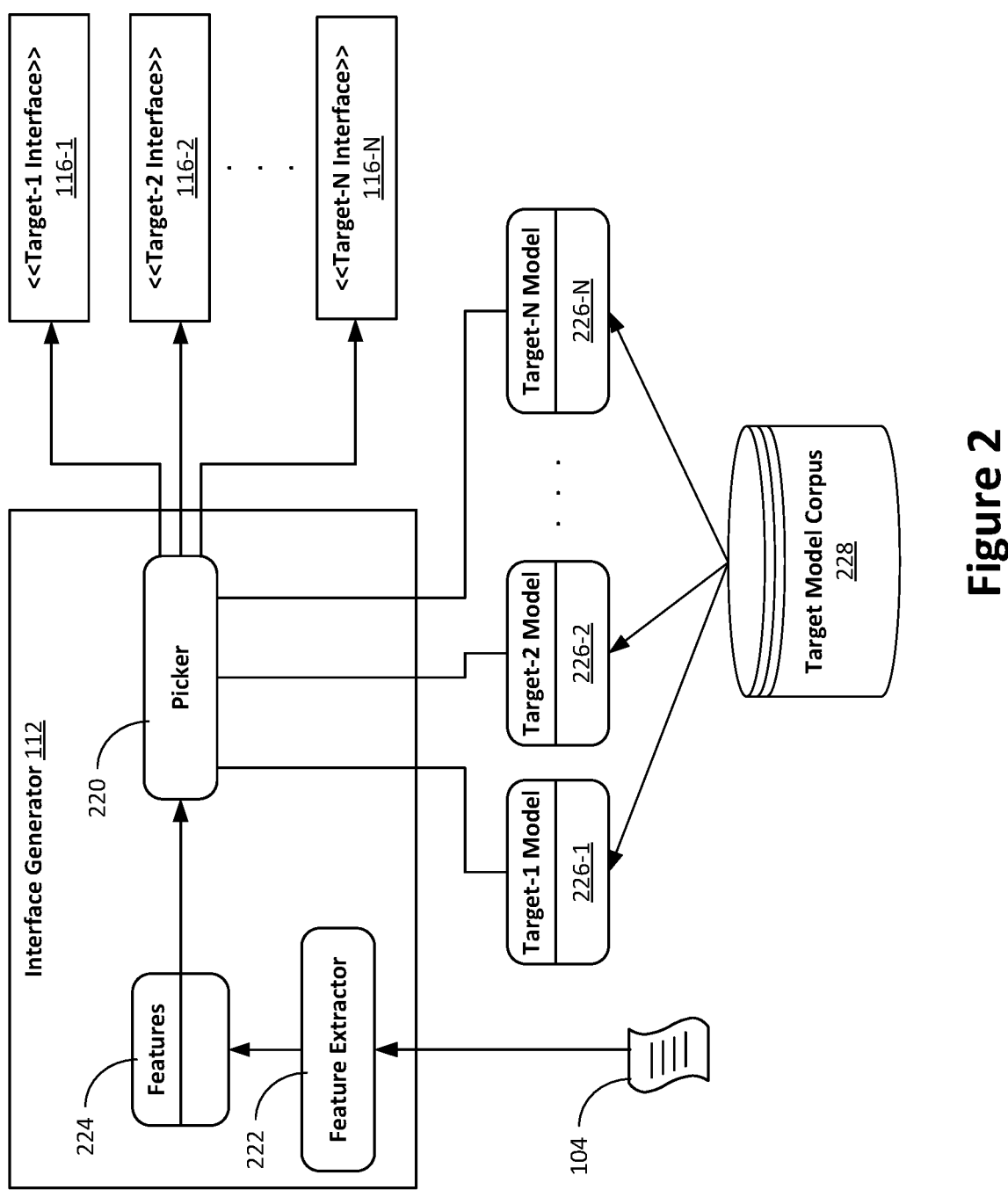
FIG. 2 is a block diagram of an idiomatic interface generator.

FIG. 2 is a block diagram of interface generator 112. Interface generator 112 includes feature extractor 222 that extracts features 224 from common specification 104. In addition to extracting features 224 from common specification 104, feature extractor 222 may group features 224 for functional completeness. That is, feature extractor 222 may ensure that common specification 104 has provided some minimal functionality that covers the expected functional cases of a particular library. For example, if common specification 104 is intended to provide a math absolute value library, then feature extractor 222 may ensure that common specification 104 has provided at least one definitional element that covers each of the functional cases of determining the absolute value of an integer and determining the absolute value of a rational number.

A corpus 228 of target models is provided in computer storage media (e.g., as files stored in computer storage media). While depicted as separate from interface generator 112 in FIG. 2, corpus 228 may be a component of interface generator 112.

Interface generator 112 also includes picker 220 for generating a target interface for each target language. Picker 220 generates the target interface for a target language given features 224 and a target model for the target language as input. Picker 220 uses target models 226-1, 226-2, . . . 226-N retrieved from corpus 228 for the different target languages at hand to generate interface definitions of target interfaces 116-1, 116-2, . . . 116-N for the different target languages based on features 224. This may involve picker 220 generating interlinguistic definitional elements from features 224 and then translating the generated interlinguistic definitional elements into idiomatic interface definitions for the different target languages that can be combined with the functional elements generated by source-to-source compiler 110 for the different target languages. Specifically, picker 220 represents features 224 as interlinguistic definitional elements and then generates interface definitions for the different target languages by a process of translating the interlinguistic definitional elements to idiomatic interface definitions that obey the target's rules for interface definitions.

Target models 226-1, 226-2, . . . 226-N may cover the different definitional elements that different target languages define. Picker 220 generates target interfaces 116-1, 116-2, . . . 116-N that use the different definitional elements of the different target languages. For example, picker 220 may generate a target interface for the C programming languages that uses structs but does not use classes, namespaces, overrides, defaults, or tuples. On the other hand, picker 220 may generate a target interface for the JAVA programming language that uses classes and overrides but that does not use structs, namespaces, functions, defaults, or tuples.

Target interfaces 116-1, 116-2, . . . 116-N generated by picker 220 are idiomatic. That is, they fit the expectations of a programmer in the target language of what constitutes a good interface. Different communities of programmers for different languages have different standards about what makes an interface good. Picker 220 can generate target interfaces 116-1, 116-2, . . . 116-N that account for these different standards. For example, picker 220 can generate a target interface in the JAVA language that uses overloading and uses classes for grouping similar concerns. Picker 220 can generate a JAVASCRIPT target interface that uses classes only for defining types of things, uses polymorphic functions to work around the lack of overloading, and groups similar concerns via namespace objects or modules. Picker 220 can generate a C target library that uses a set of naming conventions involving prefixes and suffixes on function names to work around the lack of namespace or overloading. Picker 220 can generate target interfaces 116-1, 116-2, . . . 116-N that follow different conventions for different languages for combining multiple words into a compound term. Picker 220 can generate target interfaces 116-1, 116-2, . . . 116-N that follow the different conventions for different kinds of definitional elements of a particular target language. For example, picker 220 can generate any one of the following compound term forms depending on the conventions for the particular kind of definitional element and the particular target language at hand: firstWordLower-Cased (a.ka. lower camel case), FirstWordUpperCased (a.k.a upper camel case), words_separate_by_underscores, and UNDERSCORES_BUT_ALL_CAPITALIZED. Picker 220 can generate one or more of target interfaces 116-1, 116-2, . . . 116-N that communicate failure to produce a result via exceptions as is done with most modern programming languages. However, picker 220 can also generate a target interface that communicates failure to produce a result via another mechanism such as, for example for the C, GO, or RUST languages.

Consider an example where common specification 104 defines a math library in the source programming language. In this case, common specification 104 may define two functional elements: (1) one for computing the absolute value of a given integer value, and (2) another for computing the absolute value of a given floating point value. Given this example, picker 220 can generate the following idiomatic interfaces for the target language examples:

| Programming Language | For Integer Numbers | For Real Numbers |
| --- | --- | --- |
| C | iabs(int) | fabs(double) |
| C++ | Math::abs(int) | Math::abs(double) |
| JAVA | Math.abs(int) | Math.abs(double) |

-continued

| Programming Language | For Integer Numbers | For Real Numbers |
| --- | --- | --- |
| JAVASCRIPT | | Math.abs(x) |
| KOTLIN | x.abs( ) | x.abs( ) |

As can be seen from this example, picker 220 can generate target interfaces 116-1, 116-2, . . . 116-N that account for variances across target languages in the number of function definitions needed, the words used in the definitions, the punctuation used, and whether the input precedes or follows the operator name.

Picker 220 can also generate target interfaces 116-1, 116-2, . . . 116-N that account for differences across target programming languages in the rules for when a word such as, for example, "abs" can be used in two definitions without interfering. For example, the JAVA language allows a class, method, and variable to have the same name without interfering, but JAVASCRIPT does not.

Picker 220 can also generate target interfaces 116-1, 116-2, . . . 116-N that are secure. For example, picker 220 can generate x.abs( ) style interface in the KOTLIN programming language using extension functions. On the other hand, for JAVASCRIPT, picker 220 can avoid prototype patching which is considered less secure than the style used for JAVASCRIPT in this example.

Interlinguistic Definitional Element Classes

There may be a predefined set of interlinguistic definitional element classes used by picker 220 that serve as a model of interlinguistic definitional elements for translating between features 224 extracted from common specification 104 and definitional elements for many different target programming languages. An interlinguistic definitional element may be defined as an instance of an interlinguistic definitional element class in the predefined set of interlinguistic definitional element classes. The classes in the predefined set of classes may vary depending on the set of target languages at hand.

FIG. 3A, FIG. 3B, FIG. 3C, FIG. 3D, FIG. 3E, FIG. 3F, FIG. 3G, FIG. 3H is a unified modeling language (UML) diagram representation of the predefined set of interlinguistic definitional element classes. The set of interlinguistic definitional element classes allow for representing features of many widely used target languages, however a subset of this set of classes, or a superset thereof, may be used depending on the particular set of target languages at hand. Arrows in the UML diagram represent inheritance (derivation) relationships between different interlinguistic definitional element classes. For example, in FIG. 3A, an "Archive" element class is derived from the "AbstractFileContainerElement" class, which is derived from the "AbstractFileElement" class, which is derived from the "InterlinguisticDefinitionalElement" class. By the inheritance relationship, an "Archive" element is also an "AbstractFileContainerElement," an "AbstractFileElement," and an "InterlinguisticDefinitionalElement."

Figure 3A:
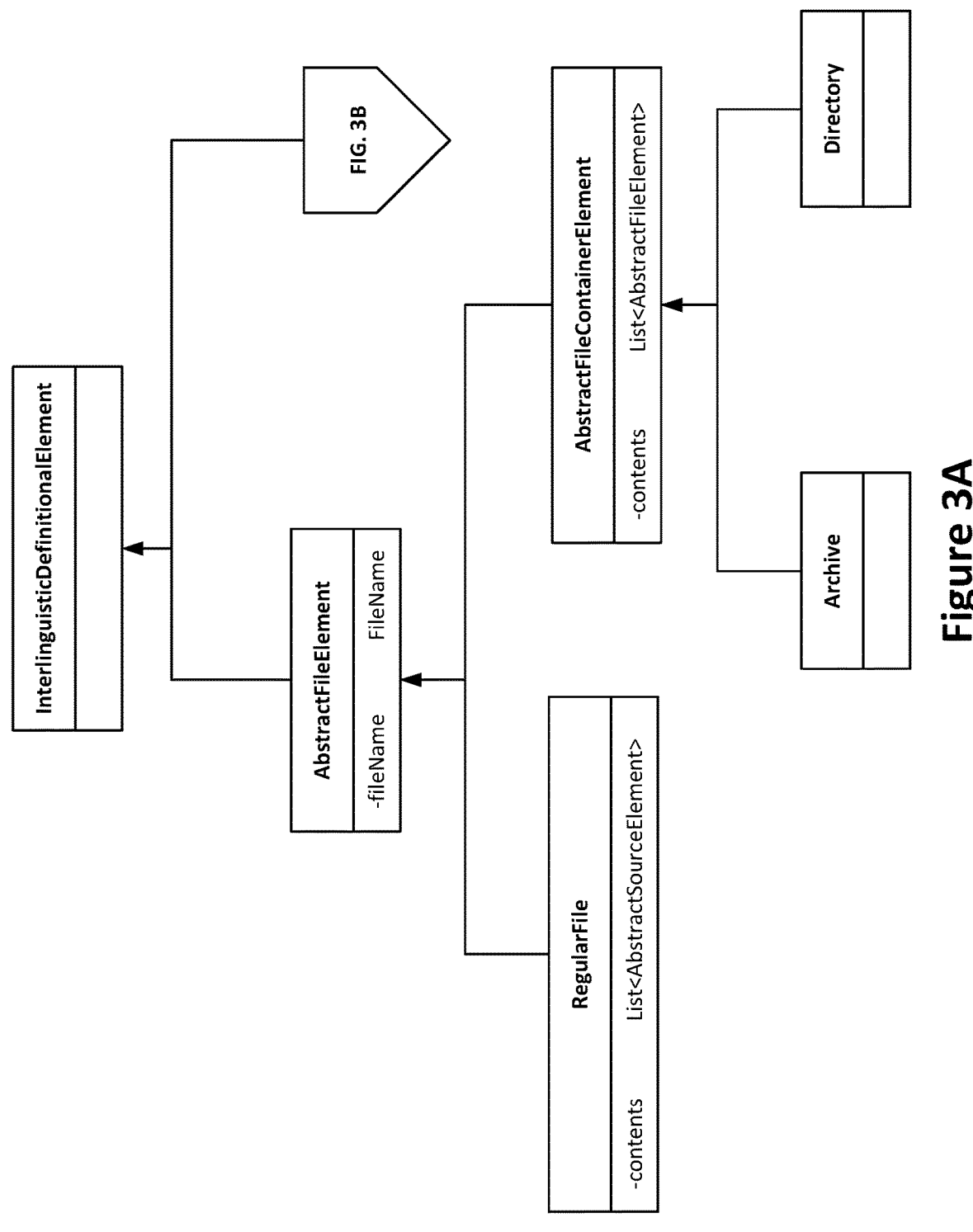

FIG. 3A shows a "InterlinguisticDefinitionalElement" class and an "AbstractFileElement" class derived therefrom. As shown, an "AbstractFileElement" has an attribute "fileName" of class "FileName." There are two derivations of the "AbstractFileElement" class: "RegularFile" class and "AbstractFileContainerElement" class. A "RegularFile" element represents a file containing text data or binary data. A "RegularFile" element has an attribute "contents" which is a list of elements each of the "AbstractSourceElement" class. An "AbstractFileContainerElement" has an attribute "contents" which is a list of elements each of the "AbstractFileElement" class. The "AbstractFileContainerElement" class has two derivations: the "Archive" class and the "Directory" class. An "Archive" element instance represents a regular file that contains other files such as, for example, a compressed file archive in ZIP or TAR format. A "Directory" element instance represents a folder that can contain other regular files or directories.

Figure 3B:
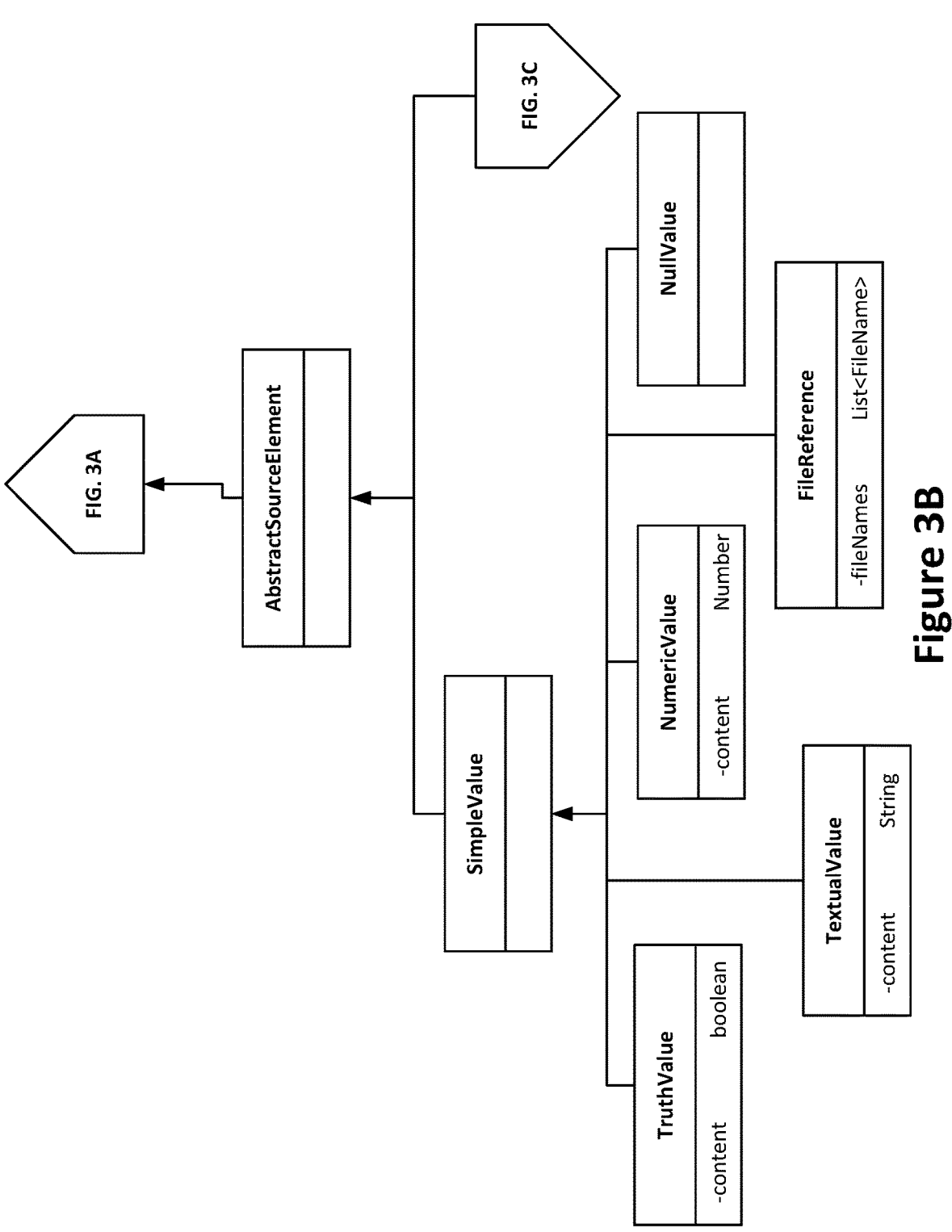

FIG. 3B shows the "AbstractSourceElement" subclass of the base class "InterlinguisticDefinitionalElement." One subclass of the "AbstractSourceElement" is the "SimpleValue" subclass which has five subclasses: "TruthValue," "Textual Value," "Numerical Value," "FileReference," and "NullValue." A "SimpleValue" element represents a value that is representable in all target languages. For example, all target languages allow for representing textual values (e.g., as strings), numeric values (e.g., as integers), truth values (e.g., as booleans), and the absence of a value (e.g., as NULL or None), even if a target language does not explicitly provide separate types for each of these. A "FileReference" has a property "fileNames" which is a list of elements of class "FileName" for referring to a list of "FileName" elements.

Figure 3C:
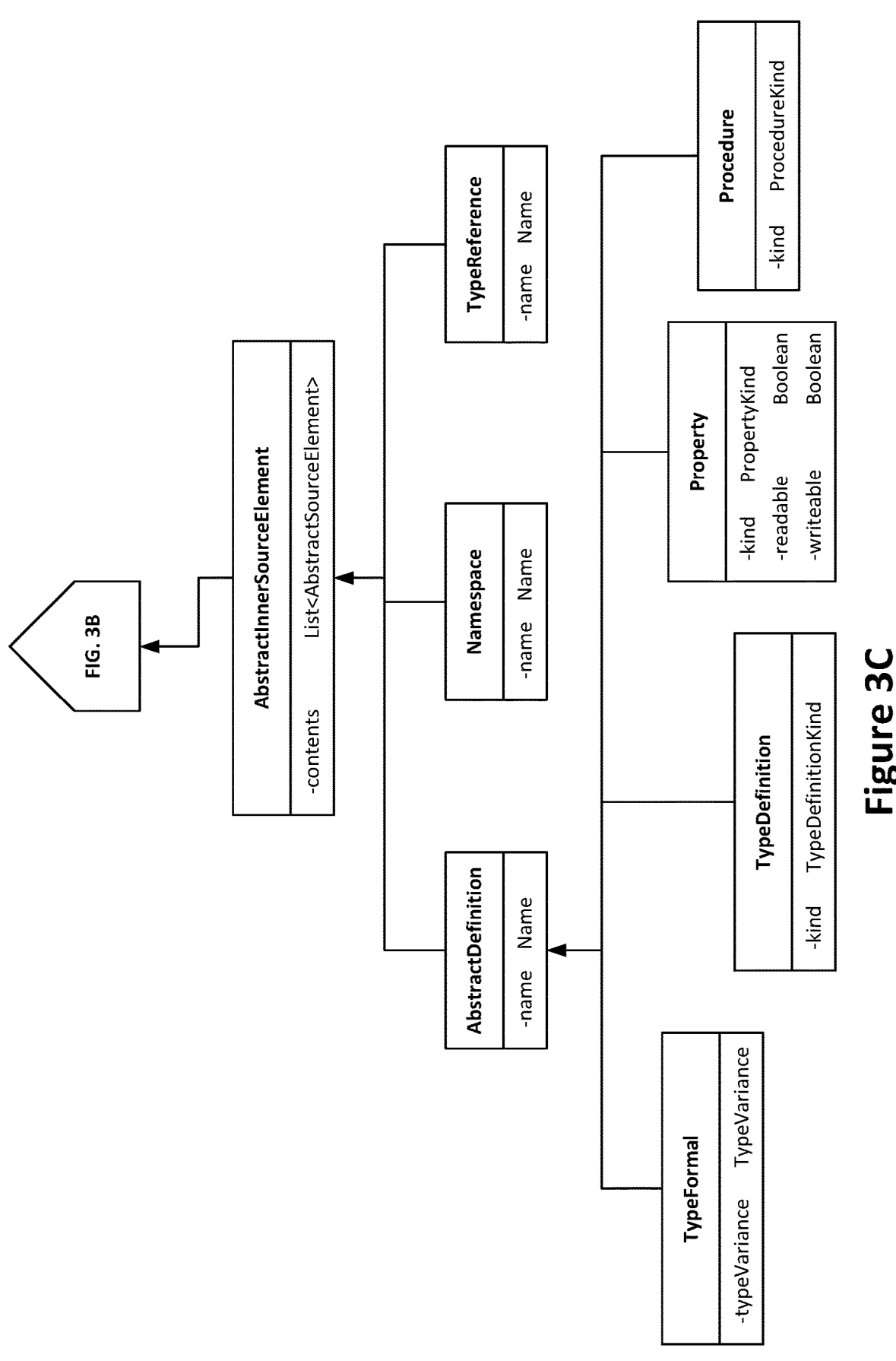

FIG. 3C shows the subclass "AbstractInnerSourceElement" which is also a subclass of the "AbstractSourceElement" subclass. An "AbstractInnerSourceElement" has an attribute "contents" that is a list of elements of class "AbstractSourceElement." There are three subclasses of "AbstractInnerSourceElement," which are: "AbstractDefinition," "Namespace," and "TypeReference." A "Namespace" element represents a named group of definitional elements. For example, a definitional element within a namespace may be referred to by joining the namespace's name and the definitional element's name around some target-specific combining punctuation. A "TypeReference" element represents a reference to a type by name. An "AbstractDefinition" element represents a named definition that is representable in all target languages. An "Abstract-Definition" element, a "Namespace" element, and a "TypeReference" element each have an attribute "name" of the class "Name." There are four subclasses of the "AbstractDefinition" subtype: "TypeFormal," "TypeDefinition," "Property," and "Procedure." A "TypeFormal" element represents a definition of a generic type parameter including its name, any restrictions on types that can bind to it, and its variance. A "TypeFormal" element has a property "variance" of class "TypeVariance" as depicted in FIG. 3E. A "TypeDefinition" element represents a definition of a type. A "TypeDefinition" element has an attribute "kind" of class "TypeDefinitionKind" as depicted in FIG. 3F. A "Property" element represents a definitional element of an interface that allows for reading or writing a fact about a value. A "Property" element has three attributes: a "kind" attribute of class "PropertyKind" that represents whether the "Property" element is computed (by executing instructions) or stored (as bits in memory) as depicted in FIG. 3G, a "readable" attribute of type "Boolean" that represents whether the programmer meant for the definitional element to be read by programmed instructions that are not privileged with respect to the container of the definitional element, and a "writeable" property of class "Boolean" that represents whether the programmer meant for the definitional element to be written by programmed instructions that are not privileged with respect to the container of the definitional element. For example, keywords used in various programming languages to define or declare instance variables of class definitions can indicate whether the instance variable is readable or writable by non-privileged code (e.g., code outside the class definition). For example, the keyword "private" in the JAVA and C++ programming languages for an instance variable in a class definition specifies that code outside the class definition cannot read or write the instance variable directly. C# provides the "readonly" keyword that can be used to define or declare a property that is read only. A "Procedure" element represents a definition of a procedure or function. A "Procedure" element has an attribute "kind" that is of class "ProcedureKind" as depicted in FIG. 3D.

Figure 3D:
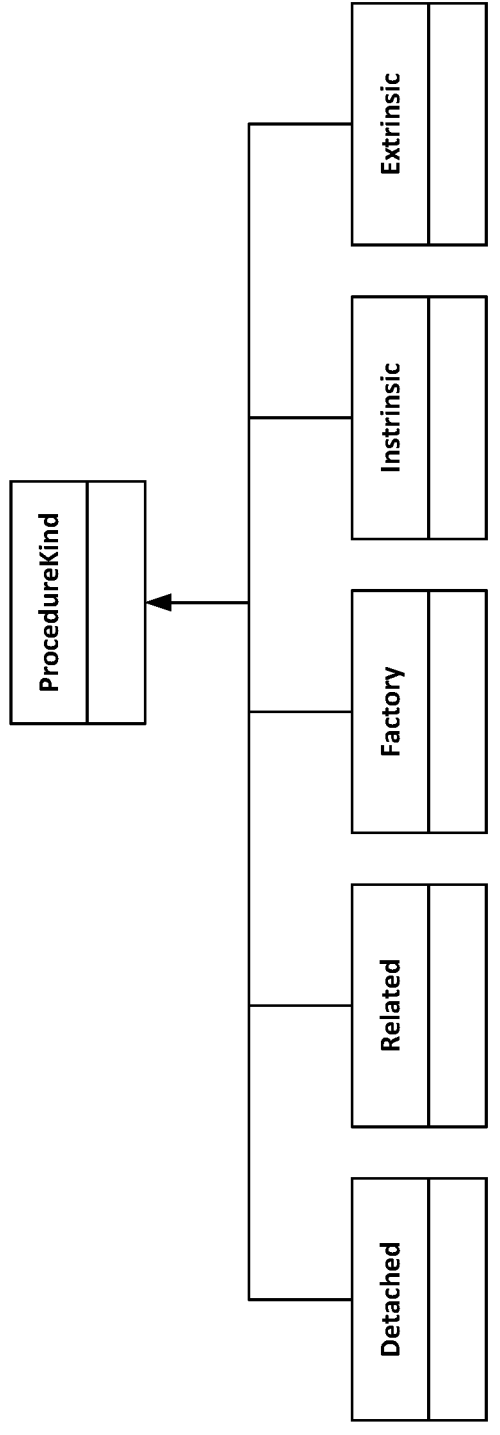
Figure 3E:
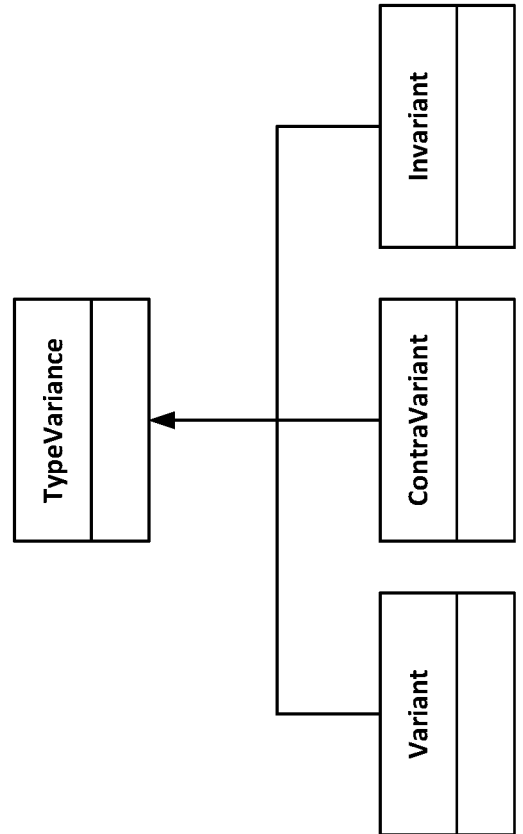
Figure 3F:
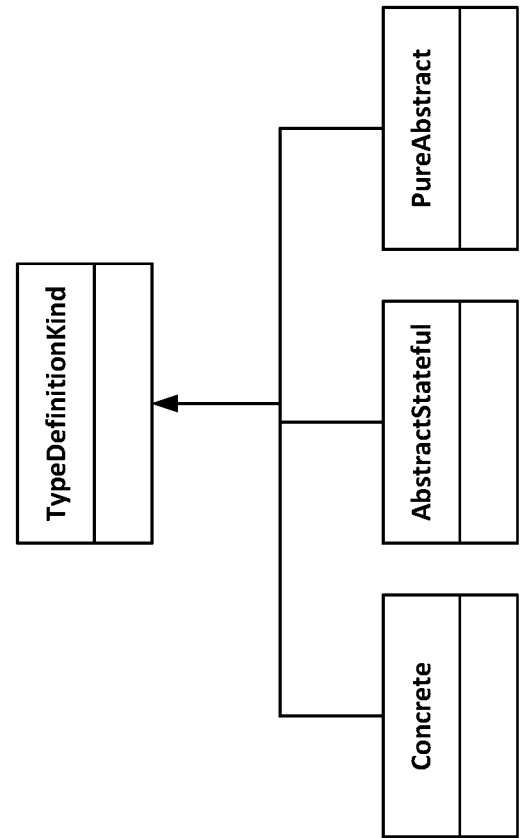
Figure 3G:
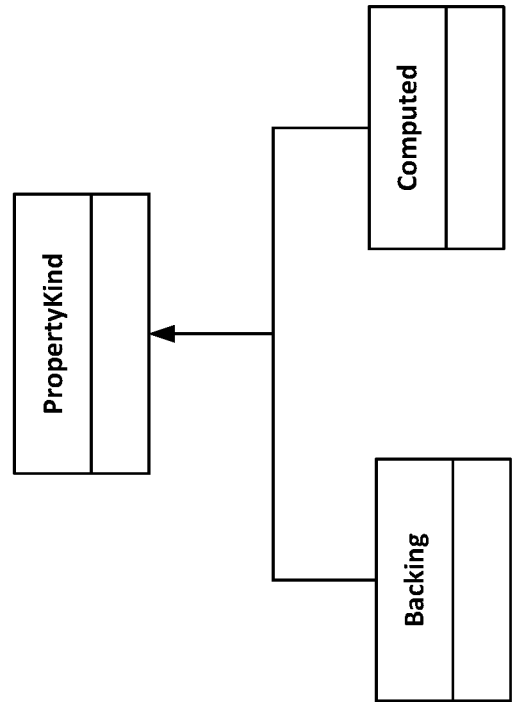

FIG. 3D shows the "ProcedureKind" type which has five subtypes representing different kinds of procedure definitions. A "Detected" element represents a definition of a procedure that is not closely associated with one type over another such as, for example, a global or module-level function in JAVASCRIPT. A "Related" element represents a definition of a procedure which is closely associated with a particular type but that does not treat one of its inputs as a subject and other as objects. For example, programmers using a target language that distinguishes between type and instance procedures might expect to mention the type name when referencing a related procedure such as, for example, via a static method in JAVA. A "Factory" element represents a definition of a procedure associated with a type and which serves to produce values of that type. This type of procedure may correspond to constructors in some target languages. Programmers using a target language that reserves the keyword "new" for value creation might expect to use them with a factory procedure. An "Intrinsic" element represents a definition of a procedure that naturally is part of a particular type. Programmers using an object-oriented target language might expect to access the procedure via dot notation syntax such as, for example, "subject.procedure-Name(object)). The procedure may be overridden by or changed in subtypes (subclasses). An "Extrinsic" element represents a definition of a procedure that naturally is part of a particular type. However, unlike an "Intrinsic" element, the procedure represented by an "Extrinsic" element cannot be overridden or changed in subtypes (subclasses). For example, the difference between extrinsic and intrinsic procedures is akin to that between KOTLIN methods and extension functions.

FIG. 3E shows the "TypeVariance" subtype which has three subclasses representing different kinds of type variances for generic type parameters. A "Variant" element represents a generic type parameter that can bind to a specified type as well as bind to a more derived type than the one specified. A "ContraVariant" element represents a generic type parameter that can bind to a specified type in addition to binding to a less derived type (more generic type) than the one specified. An "Invariant" element represents a generic type parameter that can bind only to the type specified.

FIG. 3F shows the "TypeDefinition" subclass which has three subclasses representing different kinds of types. A "Concrete" element represents a type from which values may be derived. An "AbstractStateful" element represents a type that defines or declares behavior and state, but from which values cannot be directly derived. Values of this type may only be derived from a concrete subtype. A "PureAbstract" element represents a type that defines or declares only behavior.

FIG. 3G shows the "PropertyKind" subclass which has two subclasses derived from it representing two different kinds of "Property" elements. A "Backing" element represents a "Property" element that is stored (e.g., as bits in memory). A "Computed" element represents a "Property" element that is computed (e.g., by executed instructions).

Figure 3H:
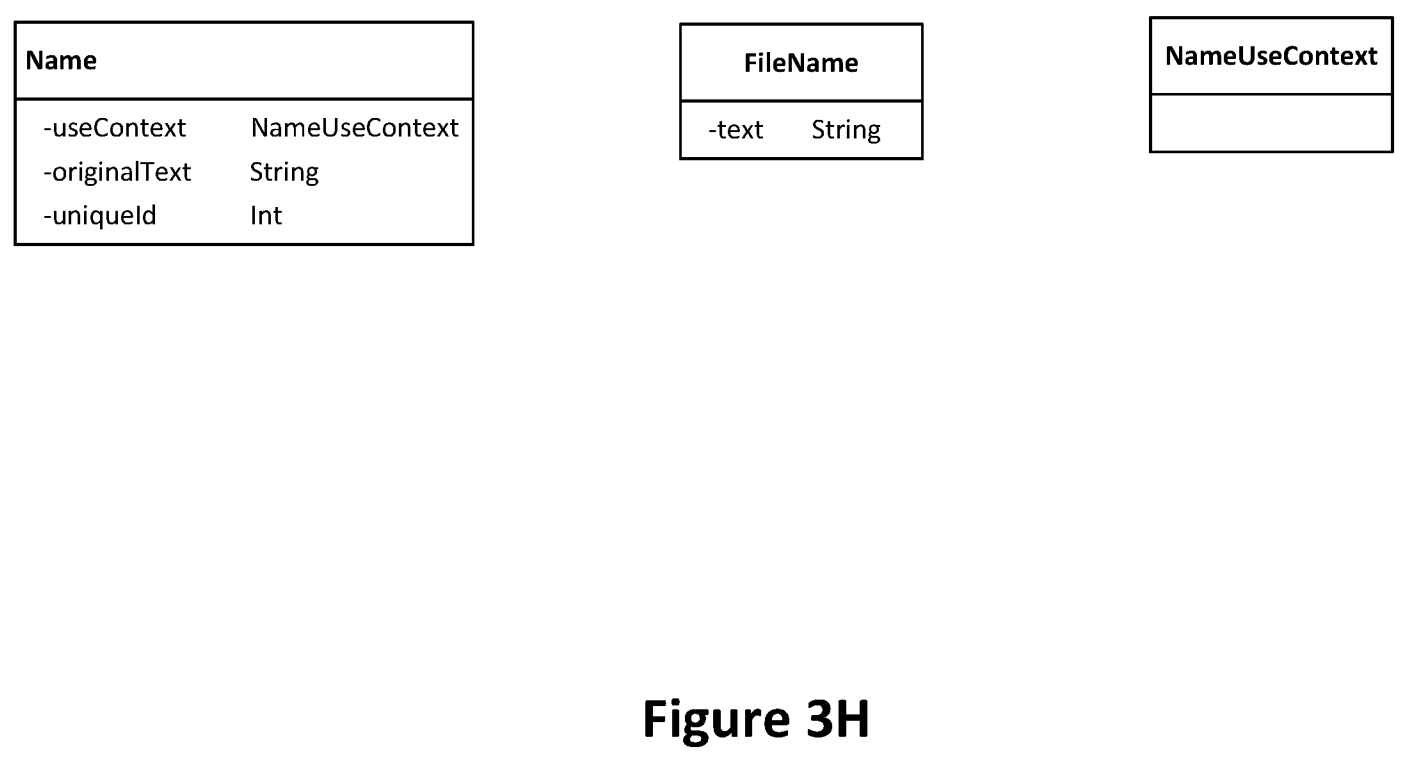

FIG. 3H shows the "Name" class having three attributes: "useContext" of class "NameUseContext," "originalText" of type String, and "uniqueId" of type Int (for integer). A "FileName" class has a "text" attribute of type String. And there is a "NameUseContext" class that represents a bundle of information that a name resolver might use to resolve name conflicts. Such information may include, for example, desired part of speech, desired joining style (e.g., lower-CamelCase or UPPER_UNDERSCORED), disallowed names, or a name conflict mask. A name conflict mask may be a bit mask that is used to determine whether two names in the same lexical output scope interfere. For example, JAVA might use distinct masks for fields and methods since the JAVA language keeps them separate.

Generative Grammar Example

A target model (e.g., 226-1) for a target language may instruct picker 220 how to generate an interlinguistic definitional element representation of features 224 such that the interlinguistic definitional element representation can be translated to idiomatic interface definitions for the target language. Accordingly, sometimes a target model is referred to herein as an interlinguistic definitional element model.

In examples described herein, interlinguistic definitional element models are based on formal grammars that are applied by picker 220 to features 224 to generate interlinguistic definitional elements of features 224 for various targets. However, other types of interlinguistic definitional elements models are possible. For example, an interlinguistic definitional element model can be machine learning-based such as, for example, a model trained in supervised learning fashion to generate (infer) interlinguistic definitional elements of features 224. For example, a separate machine learning model may be trained to do this inference for each possible target. Other possible types of interlinguistic definitional element models might include a constraint programming system, a rule-based system, or an expert system. No particular type of interlinguistic definitional element model is required by the techniques.

The following (with line numbers) is an example representation of features 224 extracted by feature extractor 222 from a possible interface definition in common specification 104. The representation may be generated by feature extractor 222 from tokens parsed from the interface definition in common specification 104. This example and other examples herein are provided herein using XML-like notation for purposes of providing clear examples. However, XML or like representation is not required of the techniques and other representations may be used including, for example, a binary data representation or other human and machine-readable representation (e.g., JAVASCRIPT OBJECT NOTATION (JSON)).

```
00:        < namespace>
01:          <name text="Colors"/>
02:          <procedure>
03:            <type>
04:              <name ref="Truth Value"/>
05:            </type>
06:            <name text="red?"/>
07:            <parameter>
08:              <type>
09:                <name ref="Visualizable"/>
10:              </type>
11:              <name text="v"/>
12:            </parameter>
13:          </procedure>
14:        < /namespace>
```

In the example above, the representation of features 224 represent a particular procedure defined or declared in common specification 104. According to the representation, the procedure is defined or declared in a "Colors"

namespace and the procedure is named "red?" The procedure definition declares a formal parameter named "v" of type "Visualizable." The procedure returns a truth value. When invoked at runtime, the implementation of the procedure (not shown) determines whether an actual parameter for the formal parameter "v" passed in a call to "red?" represents the color red and returns a truth value (e.g., a Boolean value) reflecting the determination made.

A target model (e.g., 226-2) for a target language may encompass a formal grammar for the target language that is applied by picker 220 to a representation of features 224 to generate a set of interlinguistic definitional elements for features 224 and the target language. For example, consider the following formal grammar (with line numbers) for a possible target language expressed in augmented Backus-Naur form (ABNF) as defined in Request for Comments (RFC) document 5234.

```
00:  Start = namespace | toplevels
01:  namespace = <namespace> "namespace" namespaceName "{" toplevels" }" </namespace>
02:  toplevels = toplevel toplevels | empty
03:  toplevel = procedure
04:  procedure = <procedure> type procedureName "(" parameters ")" "{" " ... " "}" </procedure>
05:  parameters = parameter parameters | empty
06:  parameter = <parameter> type parameterName </parameter>
07:  type = <type> typeName </type>
08:  namespaceName = <name style="UpperCamel" partOfSpeech="nounPhrase"/>
09:  procedureName = <name style="LowerCamel" partOfSpeech="verbPhrase"/>
10:  parameterName = <name style="LowerCamel" partOfSpeech="nounPhrase"/>
11:  typeName = <name style="UpperCamel" partOfSpeech="nounPhrase"/>
12:  empty =
```

The above example grammar produces an XML-based presentation of a set of interlinguistic definitional elements of input features 224 to which the grammar is applied by picker 220. Literals to be produced in the XML output are within double quotes. An unquoted term is a non-terminal by RFC 5234 conventions. The XML tags in the grammar effectively strip those XML tags in the input XML representation of features 224 from the XML output. If either has attributes, output an abstract token that captures both sets of attributes. This allows for name adjustment and reference resolution as described later. For example, the input "<name ref="TruthValue"/>" may be merged with the grammar "<name style="UpperCamel" partOfSpeech="nounPhrase"/>" to produce in the output "<name ref=\"TruthValue\" style=\"UpperCamel\" partOfSpeech=\"nounPhrase\">." Note that the output captures the "ref" attribute of the input and the attributes "style" and "partOfSpeech" of the grammar.

Picker 220 may convert a formal grammar of a target model for a target language into a disjunctive normal form. For example, picker 220 may convert the example formal grammar into a disjunction of conjunctions form. Picker 220 may then apply the disjunctive normal form to the representation of features 224 to generate a representation of a set of interlinguistic definitional elements of features 224 and for the target language. For example, picker 220 may generate the following representation of a set of interlinguistic definitional elements from the above-example formal grammar and the above-example representation of features 224. Here, the representation is expressed as a JAVASCRIPT OBJECT NOTATION (JSON) array. However, such representation is not required and is used merely as an example of a possible representation.

```
00:  [
01:    "namespace",
02:    ["<name text=\"Colors\" style=\"UpperCamel\" partOfSpeech=\"nounPhrase\">"],
03:    "{",
04:    "<name ref=\"Truth Value\" style=\"UpperCamel\" partOfSpeech=\"nounPhrase\">"],
05:    ["<name text=\"red?\" style=\"LowerCamel\" partOfSpeech=\"verbPhrase\">"],
06:    "(",
07:    ["<name ref=\"Visualizable\" style=\"UpperCamel\" partOfSpeech=\"nounPhrase\">"],
08:    ["<name text=\"v\" style=\"LowerCamel\" partOfSpeech=\"nounPhrase\">"],
09:    ")",
10:    "{",
11:    "...",
12:    "}",
13:    "}"
14:  ]
```

As can be seen from the above example, the representation of the set of interlinguistic definitional elements incorporates stylistic conventions for the target language as expressed in the example formal grammar Such stylistic conventions may include the form of medial capitals for definitional elements of the target language, known as a camel casing. In this example, there are two types of camel casing: upper camel case (initial uppercase letter) and lower camel case (initial lowercase letter). In the particular target language of the example, namespace names, return value types, and formal parameter types are conventionally expressed in upper camel case while procedure names and formal parameter names are conventionally expressed in lower camel case. The representation of the set of interlinguistic definitional elements allows picker 220 to generate an idiomatic interface in the target language that follows the stylistic conventions that the community of programmers of the target language use.

Picker 220 translates the set of interlinguistic definitional elements for features 224 and a target language to an idiomatic interface definition for features 224 and the target language. For example, given the above-example representation of a set of interlinguistic definitional elements, picker 220 may translate it into the following idiomatic interface definition in a particular target language (e.g., C++).

```
00:       namespace Colors {
01:           bool red(Visualizable& v) { ... }
02:       }
```

Translating to the Target Language

As with human languages, some target languages expect definitional elements to be declared in a certain order. For example, English and Mandarin are subject-verb-object where the Subject typically appears before the Verb which appears before the Object. Other human languages differ. For example, German and Hindi are subject-object-verb. These human languages place the verb at the end. Alternatively, many Celtic and Afroasiatic languages are verb-subject-object. In this case, the listener finds out what is being done before finding out who is doing or to whom.

Likewise, target programming languages have similar ordering properties that differ between target languages. For example, in the C++ programming language, types precede names (e.g., A Dentist, Alice) but in the TypeScript programming language names precede types (e.g, Alice, a dentist). Picker 220 can reorder the set of interlinguistic definitional elements generated for features 224 and a target language to match the target language's ordering conventions. For example, the target model for the target language may include preferences of how to order features and definitional elements like, for example, <returnType> and <parameters> inside a <procedure>. This is illustrated in the above example where application of the example formal grammar by picker 220 generates a list of interlinguistic definitional elements where the order of the elements in the list follows the preferences of how to order definitional elements in interface definitions in the C++ programming language.

Figure 4:
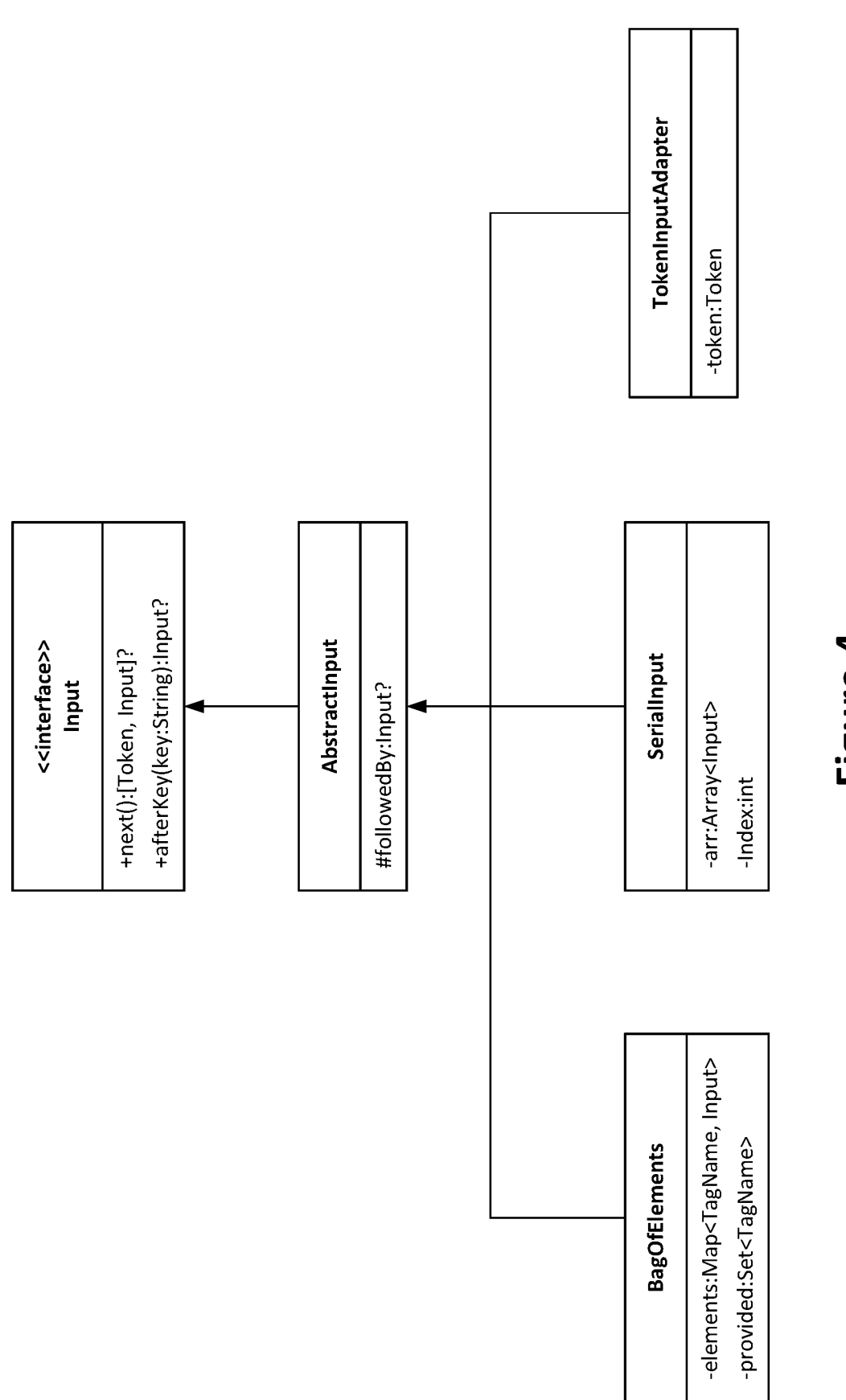
FIG. 4 is a unified modeling language (UML) diagram of providing a linearized input view of a bag of interlinguistic definitional elements.

Alternatively, picker 220 can present a linear view of an arbitrarily ordered group of interlinguistic definitional elements, also referred to herein as a "bag of elements." A way picker 220 can provide a linear view of an unordered set of interlinguistic definitional elements generated from features 224 for a target language that is suitable for translation to an idiomatic interface definition for the target language is by chaining together simpler inputs. As shown in the UML diagram of FIG. 4, three implementations of an Input interface suffice to represent a linearized bag of elements. An instance of the BagOfElements class comprises a naturally ordered set of interlinguistic definitional elements for features 224 and a target language generated by picker 220 by applying a target model for the target language to features 224. An instance of the SerialInput class stitches together a series of Input instances instead of text tokens. Accordingly, an instance of TokenInputAdapter presents individual text tokens as an Input comprising one text token. The instance of the BagOEElements class contains not only its elements, but also the set of element names that it has provided so far such that it can provide element values in as-requested order, without repeating itself. AbstractInput's followedBy property tracks the Input instance that comes next which is sufficient to let an interface that answers, "does the next token look like <propertyName>" to answer "yes and it is followed by the value of the similarly named property, then a close tag, </propertyName>, and any other as-yet unprovided elements from the bag."

Name Collisions

Picker 220 may ensure that interlinguistic definitional elements generated from features 224 for a target language do not collide with one another. Depending on the target language, two elements that collide may be rejected at a later stage by a compiler or byte-code verifier for the target language. For example, assume picker 220 generates the following target interface in the C++ programming language:

00: Color red= . . . ;
    01: bool red(Visualizable& v) { . . . }

A C++ compiler would generate a compiler error when compiling the above-interface definition because the name "red" is used both as a variable name and as a procedure name. As another example, assume picker 220 generates the following target interface in the PYTHON programming language:

00: red = . . . ;
    01: def red(v): . . .

In this case, instead of generating a compiler error, the second definition of "red" (at Line 01) would silently override the first definition of "red" (at Line 00) at runtime.

When generating a set of interlinguistic definitional elements from features 224 for a target language, picker 220 may assign distinct names to elements to avoid name collisions such as in the example provided above. To do this, picker 220 may employ at least two different strategies when generating a target interface for a target language.

Figure 5:
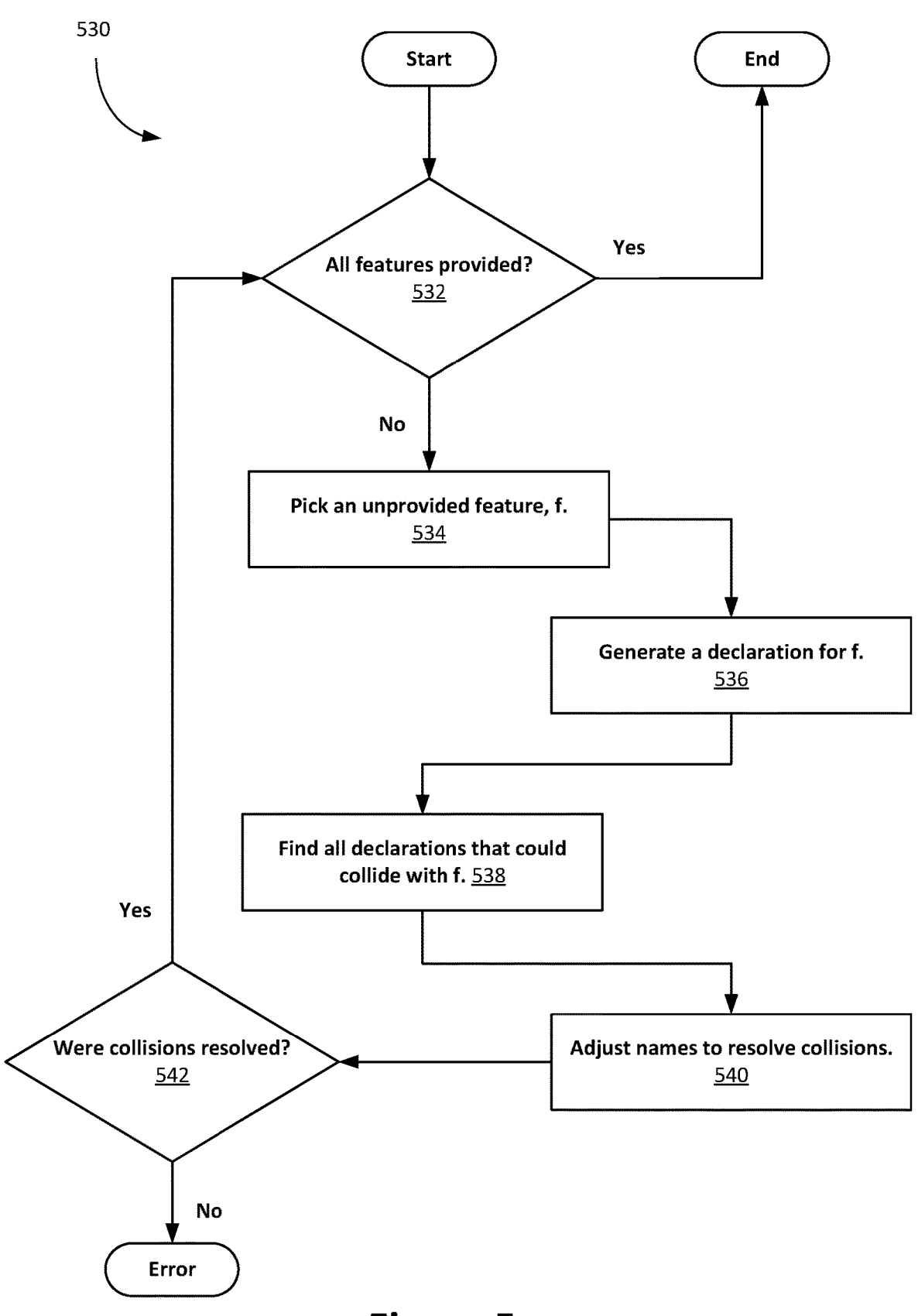
FIG. 5 is a flowchart of a process for resolving name collisions in-situ.

In one strategy, picker 220 ensures names are distinct in-situ. In particular, when generating a set of interlinguistic definitional elements, picker 220 detects duplicate definitions and adjusts the names of the definitions so that the definitions do not collide with each other. FIG. 5 is a flowchart 530 of a process performed for picker 220 for ensuring names are distinct in-situ. At decision 532, picker 220 determines whether all features 224 have been provided in the set of interlinguistic definitional elements. If so, then the process ends successfully. If all features 224 have not been provided, then, at block 534, picker 220 picks 534 an unprovided feature designated as fin FIG. 5. Next, at block 536, picker 220 generates a declaration in the set of interlinguistic definitional elements for the unprovided feature f. Next, at block 538, picker 220 finds any and all declarations for features already provided in the set of interlinguistic definitional elements that could collide with the unprovided feature f. Next, at block 540, picker 220 adjusts names of the declaration generated at block 546 or the declarations identified at block 538 to resolve the collisions. At decision 542, if picker 220 cannot resolve the collisions through the adjustment at block 540, then the process ends with an error. Otherwise, the process returns to block 532 to consider the next unprovided feature, if any. Picker 220 may not be able to resolve the collisions if common specification 104 has too many similar names and suitable non-arbitrary synonyms cannot be determined.

In a second strategy, picker 220 resolves name collisions after the set of interlinguistic definitional elements for a target language have been generated for all features 224. In particular, the generated set of interlinguistic definitional elements may contain incomplete definitions with stylistic metadata. Picker 220 may then collate the generated elements by name and replace names to resolve ambiguities. For example, consider a target interface for the C programming language that is to offer two procedures: (1) one procedure for determining the absolute value of an integer, and (2) a second procedure for determining the absolute value of a floating-point value. When generating a set of interlinguistic definitional elements for features 224, picker 220 might generate two procedure definitions with the same tentative name. For example, picker 220 might generate one "abs" procedure for determining the absolute value of an integer and a second "abs" procedure for determining the absolute value of a floating-point value. In this case, picker 220 might prepend a type indicator to the tentative name to resolve the ambiguity. For example, picker 220 can change the tentative name of the first procedure to "iabs" to indicate that the procedure is for determining the absolute value of an integer and change the tentative name of the second procedure to "fabs" to indicate that the procedure is for determining the absolute value of a floating point value.

Figure 6:
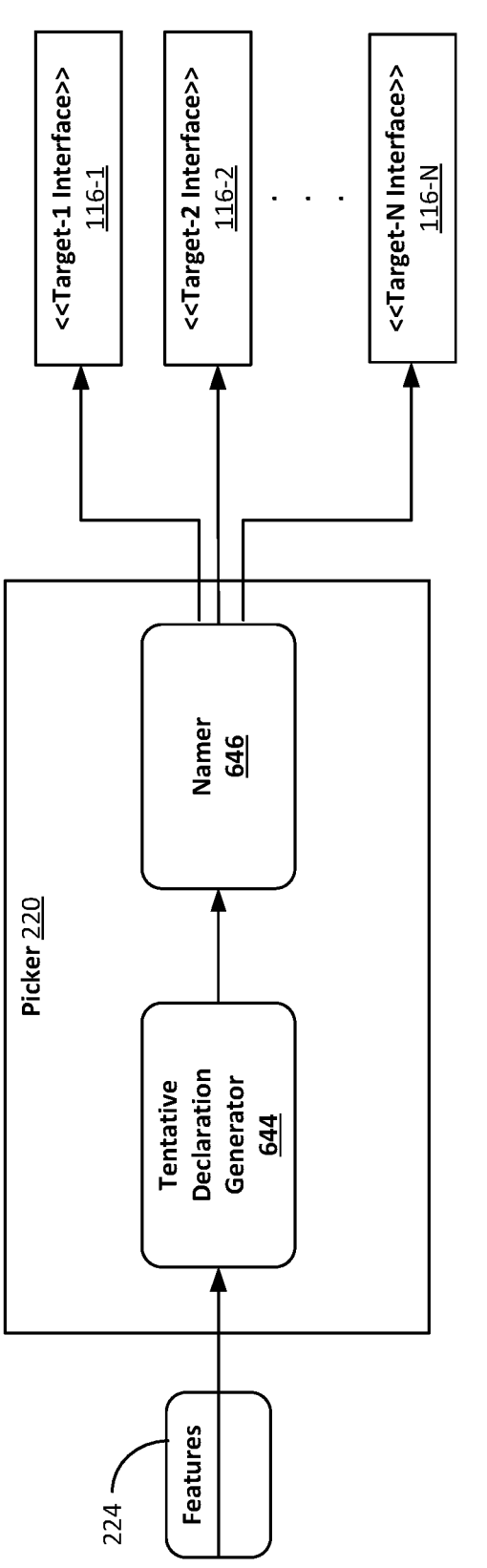
FIG. 6 is a block diagram of a two-phase picker for resolving name collisions.

FIG. 6 depicts picker 220 that implements the second strategy. Tentative declaration generator 644 generates a preliminary set of interlinguistic definitional elements from features 224 for a target language. The preliminary set of interlinguistic definitional elements may encompass declarations with tentative names. After the preliminary set of interlinguistic definitional elements have been generated for all features 224, the preliminary set of interlinguistic definitional elements may be passed to namer 646. Namer 646 may resolve any name collisions to produce a final set of interlinguistic definitional elements for the target language. Namer 646 may then use the final set of interlinguistic definitional elements to produce a target interface (e.g., 116-2) for the target language.

Some name collisions can be resolved by picker 220 by adjusting parts of speech. For example, if there is a value corresponding to the color red, and a procedure which checks whether something is red, and both tentatively have the name "red", and a target model for a target language suggests that procedures that answer yes-no questions be verb phrases starting with "is", then the collision or interference can be resolved by adjusting the procedure name from "red" to "isRed."

In the case where a name collision cannot be resolved by picker 220 without being arbitrary, then a programmer or user can be prompted in a computer user interface (e.g., command line interface or graphical user interface) to resolve the name collision. For example, it is possible for picker 220 to automatically substitute a synonym for a name collision. For example, picker 220 could automatically substitute a colliding second occurrence of "throw" with "chuck" or "toss." However, such automatic substitution may invite confusion by programmers. Rather than arbitrarily picking a substitute, picker 220 may employ a collision avoidance strategy of last resort. For example, picker 220 could prompt a user in a computer user interface to input a different name to resolve a name collision. For example, instead of selecting "chuck" or "toss" as a substitute for the second occurrence of "throw," the user might select a substitute that is less arbitrary to the user such as "throwUp" (as in up the call stack) or "throwOut" (as in discard). In some implementations, the user's input can be remembered for subsequent occurrences of the same name collision. For example, the user's input can be stored in a file, database, or the like. Then, on the subsequent occurrence of the name collision the user's previous input could automatically be selected as a substitute without having to prompt the user again.

Another strategy of last resort is to partition pairs of mutually colliding definitions into different namespaces. For example, two pairs of name collisions (beast, beast) and (wickedWitch, wickedWitch) may be partitionable in conjunction with user-provided metadata selecting namespace names into namespace East {beast, wickedWitch} and namespace West {beast, wickedWitch}. The user-provided namespace names may be provided by the user in response to prompting the user in a computer user interface.

In addition to avoiding name collisions in a target language, picker 220 may need to avoid names that have special meanings in the target language, like reserved keywords. For example, the word "double" has a special meaning in many C-like languages so using that as the name of a procedure would cause compilers of those languages to reject it. The target model for the target language may incorporate a block list or dictionary relating disallowed terms to substitutes so that picker 220 can determine when to look for synonyms or variants of a name when generating a target interface for a target language.

Hoisting

Once name collisions have been resolved by picker 220, picker 220 may need to resolve references within a set of interlinguistic definitional elements for a target language. For example, if one feature of features 224 defines a type, Color, and another feature of features 224 defines a named constant value, RED, of type, Color, the second definition may need to reference the first, in a target language-specific manner.

Picker 220 can produce a phrase of definitional elements in a target interface that reliably references the former definition. As an example, picker 220 might generate the following phrase of definitional elements that uses the double colon ':' scope resolution operator in a target interface for C++ to unambiguously reference a prior definition of the type Color:

00: Color::<some defined variable name local to Color>

As another example, picker 220 might generate the following phrase of definitional elements in a target interface for the JAVA language to unambiguously reference a prior definition of the Color type:

00: com.example.Color

Picker 220 can also generate "import" and "include" statements in target interfaces as needed. For example, some target languages may only allow referencing certain kinds of names in conjunction with other definitions. Picker 220 can generate a source code file of a target interface for a target language that has the appropriate "import" and "include" statements in the source code file. For example, picker 220 can generate a JAVASCRIPT source code file having the following statement before any references in the source code file to the type Color:

00: import Color from 'color'

Picker 220 can "hoist" "import" and "include" statements that it generates when translating a set of interlinguistic definitional elements. Hoisting involves moving a sequence of lexical tokens up or sideways. One way for picker 220 to support hoisting is to use destination markers in the set of interlinguistic definitional elements for a target language. A destination marker in a set of interlinguistic definitional elements for a target language can be processed by a target-independent hoister component of picker 220. Such processing performed by picker 220 may include moving one or more tokens of the set of elements to an appropriate region of a source code file of a target interface for the target language where the appropriate region is indicated by the destination marker. After hoisting is finished, the destination markers can be discarded.

Figure 7:
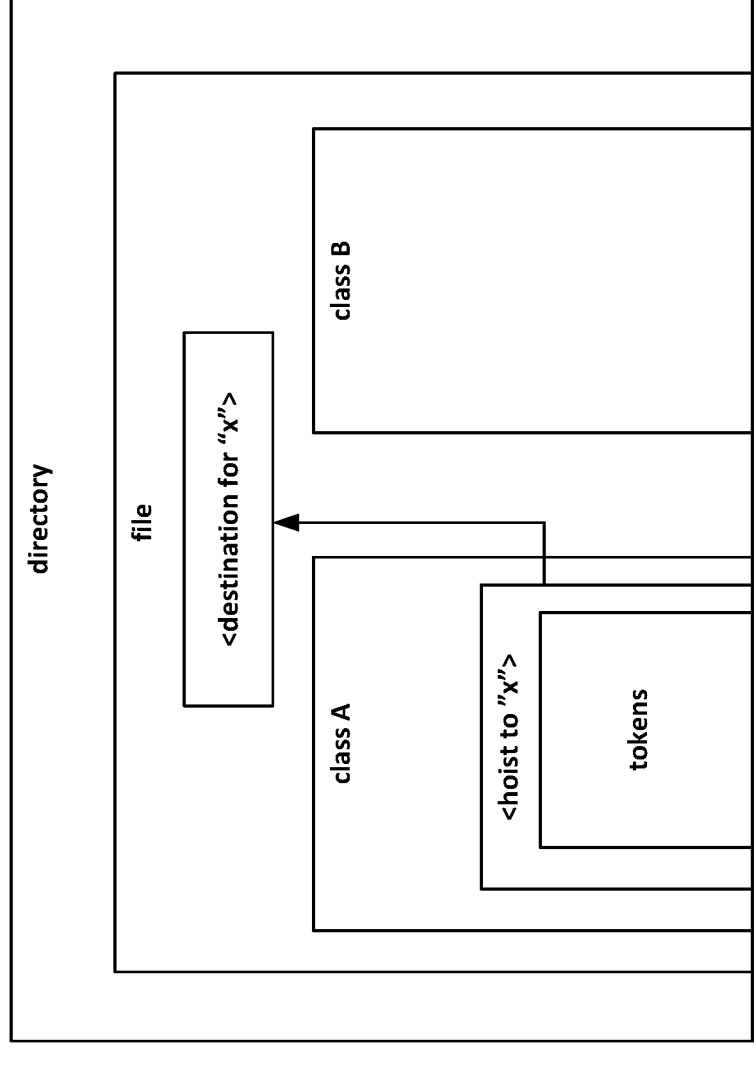
FIG. 7 is a schematic depicting hoisting.

Hoisting is illustrated by the example of FIG. 7 which depicts a source code file in a directory. The source code file defines a target interface in a target language as generated by picker 220. In the source code file, picker 220 has hoisted tokens within a definition of class A to a destination at the beginning of the file before the class definitions. For example, if the target language is JAVA, then the hoisted tokens may encompass a JAVA import phrase (e.g., "import com.example.Color") and the destination for the hoisted tokens may be after the package declaration in the file and before the class declarations since a valid JAVA file includes an optional package declaration, zero or more imports, and zero or more class declarations, in that order.

Source Code Files

For efficiency, picker 220 can limit the number of files and directories that a target programming language must consider when the target interface generated by picker 220 for the target language is loaded according to the target language's loader. Picker 220 can require that definitions of the target interface appear in files named in a certain way. To do this, picker 220 can group interlinguistic definitional elements generated by picker 220 for a target language into file indicators including possibly even archive file indicators. Picker 220 can store the results of translating a set of interlinguistic definitional elements grouped together for a file into that file.

Merging Redundant Namespaces

Picker 220 may merge redundant namespace definitions in a preliminary set of interlinguistic definitional elements generated by picker 220 from features 224 for a target language. This merging is useful because different target languages have different stylistic conventions around helper procedures such as JAVA static method, KOTLIN companion object methods or extension functions, PYTHON functions that operate both as methods and as regular functions that receive "self" as their first parameter.

Message Send Syntax

Picker 220 can generate a set of interlinguistic definitional elements for a target language from the same feature of features 224 where the target language includes a distinction between:

attached intrinsic procedures which programmers would expect to be available via message send syntax (e.g., infix dot or arrow notation) and which subtypes are able to override, attached extrinsic procedures which programmers would expect to be available via message send syntax, but which cannot be overridden by subtypes, and detached procedures which need not be available via message send syntax.

In this case, picker 220 can generate a preliminary target interface letting individual procedures in the set of interlinguistic definitional elements translate to definitions in the preliminary target interface that exist by themselves within partial envelopes that serve to put them in context. Then, picker 220 can perform a post-processing operation that merges the contents of identically named envelopes where the name of the envelope derives from the same feature of features 224. For example, picker 220 might generate the following preliminary JAVA target interface:

```
00:      class C { void f( ) { ... } }
01:      class C { static void g( ) { ... } }
```

The post-processing pass performed by picker 220 on the preliminary interface may then merge the contents of identically named "C" envelopes as in the following JAVA target interface:

```
00:      class C {
01:          void f( ) { ... }
02:          static void g( ) { ... }
03:      }
```

In this case, picker 220 can determine that both class C's in the preliminary target interface are the same class C by virtue of deriving from the same feature of features 224.

As another example, for a target language like KOTLIN, the envelopes for the three kinds of definitions above might look like the following:

```
00:      // attached intrinsic example
01:      class C {
02:          fun foo( )
03:      }
00:      // first attached extrinsic example
01:      fun (C).foo( )
00:      //second attached extrinsic example
01:      class C {
02:          companion object {
03:              fun foo( )
04:          }
05:      }
00:      // detached example
01:      fun foo( )
```

With this example, picker 220 could combine the attached intrinsic example and the second attached extrinsic example into one "class C{ }." In addition, picker 220 could combine any "class C{ }" and top-level function definitions from the first attached extrinsic example and the detached example into one file relating to the type.

Translating Types

Picker 220 can handle target languages that strictly bound the ways that a program in the target language can refer to a type. For example, the target model for a target language can express that there cannot be multiple names for a type definition. Picker 220 can also adjust functional elements of a target implementation to use the target interface assigned name for a type and to have appropriate information hiding pragmas. For example, picker 220 may invoke a custom programmed per-target language hook or plugin to adjust compiler outputs (e.g., to adjust a target implementation for a target language).

Picker 220 can handle differences between target languages where generic type parameter variance is specified. Typically, there are two different places where such variance is specified: (1) within the definition of the generic type (e.g., as in SCALA OR KOTLIN), or (2) at uses of the generic type (e.g., as in JAVA). To handle this, picker 220 can generate interlinguistic definitional elements for generic type formals and generic type actuals to both include variance information. Then, when translating the set of interlinguistic definitional elements to a target interface for a target language, picker 220 can ignore one in favor of the other depending on the requirements for specifying generic type parameter variance of the target language.

Basic Computing Device

The techniques may be implemented by at least one computing device. If by more than one computing device, the techniques may be implemented in whole or in part using a combination of computing devices that are coupled together using a network, such as a packet data network. A computing device used in an implementation of the techniques may be hard-wired to perform some or all of the techniques, or may include digital electronic devices such as at least one application-specific integrated circuit (ASIC) or field programmable gate array (FPGA) that is persistently programmed to perform some or all of the techniques, or may include at least one general purpose hardware processor programmed to perform some or all of the techniques pursuant to program instructions in firmware, memory, other storage, or a combination. A computing device used in an implementation of the techniques may also combine custom hard-wired logic, ASICs, or FPGAs with custom programming to accomplish some or all of the techniques. A computing device used in an implementation of the techniques may be a server computing device, a workstation computing device, a personal computing device, a portable computing device, a handheld computing device, a mobile computing device or any other computing device that incorporates hard-wired or program logic to implement some or all of the techniques.

Figure 8:
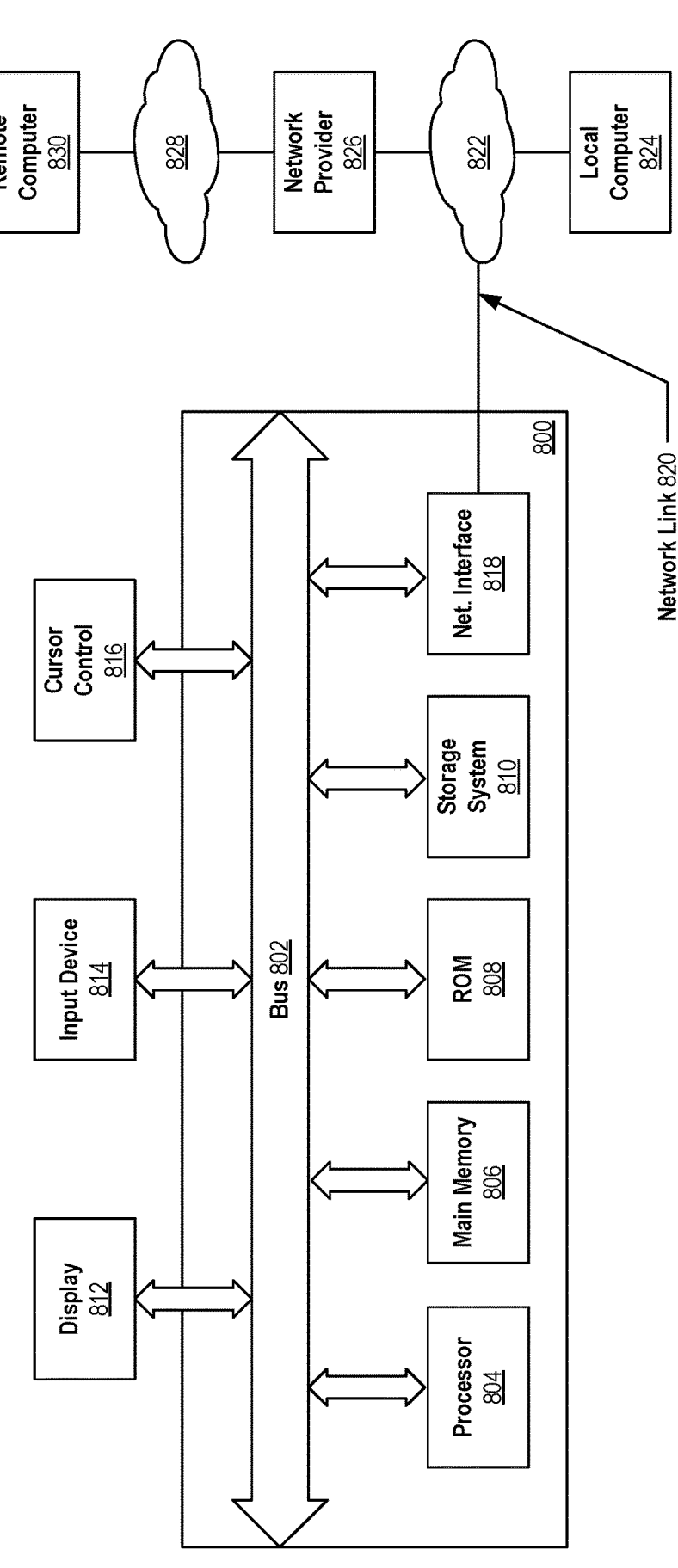
FIG. 8 is a block diagram of an example basic computing device that may be used in an implementation of the techniques.

FIG. 8 is a block diagram of an example basic computing device that may be used in an implementation of the techniques. In the example of FIG. 8, computing device 800 and instructions for implementing some or all the techniques in hardware, software, or a combination of hardware and software, are represented schematically, for example as boxes and circles, at the same level of detail that is commonly used by persons of ordinary skill in the art to which this disclosure pertains for communicating about computer architecture and computing device implementations.

Computing device 800 includes an input/output (I/O) subsystem 802 which may include a bus or other communication mechanism for communicating information or instructions between the components of the computing device 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computing device 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory storage media accessible to processor 804, can render computing device 800 into a special-purpose machine that is customized to perform the operations specified in the instructions.

Computing device 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute some or all of the techniques.

The instructions in memory 806, ROM 808 or storage 810 may comprise one or more sets of instructions that are organized as modules, methods, objects, functions, routines or calls. The instructions may be organized as one or more computer programs, operating system services or application programs including mobile apps. The instructions may comprise an operating system or system software; one or more libraries to support multimedia, programming or other functions; data protocol instructions or stacks to implement Transmission Control Protocol/Internet Protocol (TCP/IP), HyperText Transfer Protocol (HTTP) or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computing device 800 may be coupled via I/O subsystem 802 to at least one output device 812. Output device 812 may be a digital computer display. Examples of a display that may be used include a touch screen display or a light-emitting diode (LED) display or a liquid crystal display (LCD) or an e-paper display. Computing device 800 may include other types of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators, or servos.

An input device 814 may be coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

Computing device 800 may comprise an internet of things (IoT) device or other computing appliance in which one or more of the output device 812, input device 814, and control device 816 are omitted. The input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator, or a servo.

When computing device 800 is a mobile or portable computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computing device 800. Output device 812 may include hardware, software, firmware, and interfaces for generating position reporting packets, notifications, pulse or heartbeat signals, or other recurring data transmissions that specify a position of the computing device 800, alone or in combination with other application-specific data, directed toward host 824 or server 830

Computing device 800 may implement some or all the techniques using customized hard-wired logic, at least one ASIC or FPGA, firmware or program instructions or logic which when loaded and used or executed in combination with computing device 800 causes or programs computing device 800 to operate as a special-purpose machine.

The techniques performed by computing device 800 may be performed in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform some or all the techniques. Hard-wired circuitry may be used in place of or in combination with software instructions.

The term "storage media" as used herein refers to any non-transitory computer-readable media that store data or instructions that cause a machine to operation in a specific fashion. Such storage media may comprise non-volatile media or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computing device 800 can receive the data on the communication link and convert the data to be read by computing device 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computing device 800 also includes a communication interface 818 coupled to bus 802. Communication interface 818 provides a two-way data communication coupling to network link 820 that is directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine, or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls.

Computing device 800 and server 830 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or NoSQL, an object store, a graph database, a flat file system or other data storage.

Computing device 800 can send messages and receive data and instructions, including program code, through a network, network link 820 and communication interface 818. In the Internet example, server 830 might transmit a requested code for an application program through Internet 828, ISP 826, local network 822 and communication interface 818. The received code may be executed by processor 804 as it is received, or stored in storage 810, or other non-volatile storage for later execution.

Basic Software System

Figure 9:
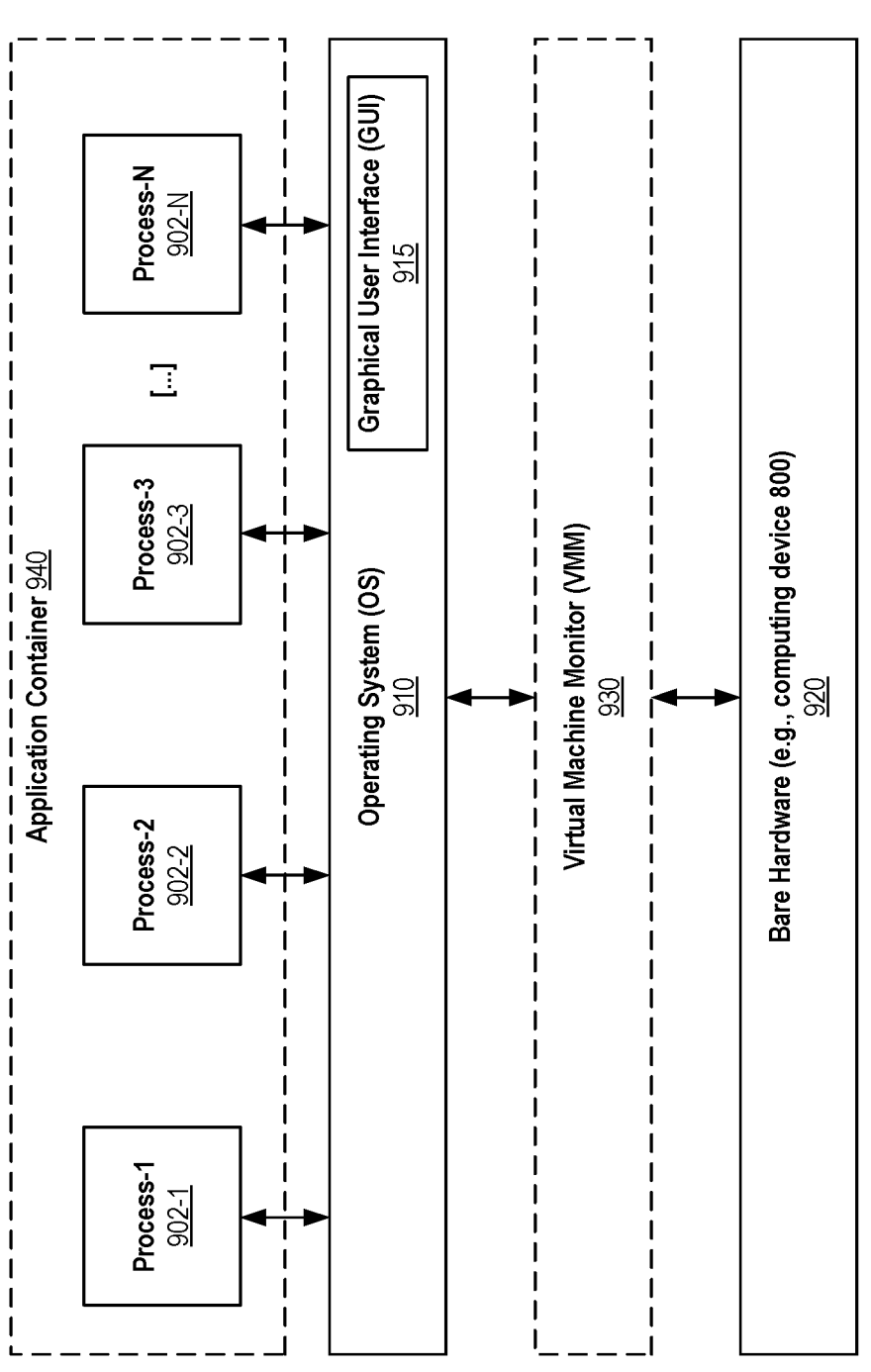
FIG. 9 is a block diagram of an example basic software system that may be employed for controlling the operation of the basic computing device of FIG. 8.

FIG. 9 is a block diagram of an example basic software system 900 that may be employed for controlling the operation of computing device 800 of FIG. 8. Software system 900 and its components, including their connections, relationships, and functions, is meant to be an example only, and not meant to limit implementations of the techniques. Other software systems suitable for implementing the techniques may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

OS 910 manages low-level aspects of computer operation, including managing execution of processes, represented as 902-1, 902-2, 902-3 . . . 902-N, memory allocation, file input and output (I/O) and device I/O. One or more application programs may be "loaded" (e.g., transferred from fixed storage 810 into memory 806) for execution as one or more processes by the system 900. The applications or other software intended for use on computing device 800 may also be stored as a set of downloadable computer-executable instructions, for example, for downloading and installation from an Internet location (e.g., a Web server, an app store or other online service).

The execution of application program instructions may implement a process (e.g., 902-2) in the form of an instance of a computer program that is being executed and consisting of program code and its current activity. Depending on the operating system (OS), a process (e.g., 902-3) may be made up of multiple threads of execution that execute instructions concurrently. In this context, a computer program is a passive collection of instructions, while a process (e.g., 902-1) may be the actual execution of those instructions. Several processes (e.g., 902-1 and 902-2) may be associated with the same program; for example, opening up several instances of the same program often means more than one process is being executed, or a program that initially launches as a single process may subsequently spawn (e.g., fork) additional processes.

OS 910 may implement multitasking to allow processes 902-1, 902-2, 902-3 . . . 902-N to share processor 804. While each processor 804 or core of the processor executes a single task at a time, computing device 800 may be programmed to implement multitasking to allow each processor to switch between tasks that are being executed without having to wait for each task to finish. Switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. For security and reliability, OS 910 may prevent direct communication between independent processes, providing strictly mediated and controlled inter-process communication functionality.

In some instances, processes 902-1, 902-2, 902-3 . . . 902-N and the application programs they implement may execute within application container 940. Application containers generally are a mode of operation of OS 910 in which OS 910 allows the existence of multiple isolated user space instances to run on OS 910. Application container 940 is an example of one such instance. The instances themselves are sometimes alternatively referred to as zones, virtual private servers, partitions, virtual environments, virtual kernels, or jails. Application containers provide a mechanism whereby finite hardware computing resources such as CPU time and storage media space can be allocated among the instances.

Software system 900 includes a graphical user interface (GUI) 915, for receiving user commands and data in a graphical (e.g., "point-and-click" or "touch gesture") fashion. These inputs, in turn, may be acted upon by system 900 in accordance with instructions from operating system 910 or processes 902-1, 902-2, 902-3 . . . 902-N. GUI 915 also serves to display the results of operation from OS 910 and processes 902-1, 902-2, 902-3 . . . 902-N 902, whereupon the user may supply additional inputs or terminate the session (e.g., log off).

OS 910 can execute directly on bare hardware 920 (e.g., processor 804) of computing device 800. Alternatively, a hypervisor or virtual machine monitor (VMM) 930 may be interposed between bare hardware 920 and OS 910. In this configuration, VMM 930 acts as a software "cushion" or virtualization layer between OS 910 and bare hardware 920 of computing device 800.

VMM 930 instantiates and runs one or more virtual machine instances ("guest machines"). Each guest machine comprises a "guest" operating system, such as OS 910, and one or more applications, such as applications 902, designed to execute on the guest operating system. VMM 930 presents the guest operating systems with a virtual operating platform and manages the execution of the guest operating systems.

In some instances, VMM 930 may allow a guest operating system to run as if it is running on bare hardware 920 of computing device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930. In these instances, the guest operating system is "aware" that it executes on a virtual machine monitor. In other words, VMM 930 may provide para-virtualization to a guest operating system in some instances.

Cloud Computing

The techniques may be implemented in a "cloud computing" environment. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (e.g., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (e.g., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

OTHER ASPECTS OF THE DISCLOSURE

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

39

What is claimed is:

1. A method comprising:

generating, by an automatic interface generator, first interfaces for first libraries from a first common specification, the first interfaces comprising first interface definitions, the first interface definitions comprising first definitional elements in different programming languages, the first definitional elements allowing use of first functional elements of the first libraries by first clients;

examining the first clients of the first libraries to determine a subset of functional elements of the first functional elements that are actually used by the first clients, wherein examining the first clients of the first libraries to determine the subset of functional elements of the first functional elements that are actually used by the first clients comprises scanning source code files in the different programming languages to determine the subset of definitional elements of the first definitional elements that allow use by the first clients of the subset of functional elements of the first functional elements; and outputting metadata indicating a subset of definitional elements of the first definitional elements that allow use by the first clients of the subset of functional elements of the first functional elements.

2. The method of claim 1, further comprising:

generating, by the automatic interface generator, second interfaces for second libraries from a second common specification, the second interfaces comprising second interface definitions, the second interface definitions comprising second definitional elements in the different programming languages, the second definitional elements allowing use of second functional elements of the second libraries by the first clients; and wherein generating the second interfaces comprises the automatic interface generator using the metadata to verify that the second definitional elements comprise the subset of definitional elements of the first definitional elements that allow use by the first clients of the subset of functional elements of the first functional elements.

3. The method of claim 2, wherein the second common specification is a modified version of the first common specification.

4. The method of claim 1, further comprising:

fetching, by the automatic interface generator, the metadata from a common module repository.

5. The method of claim 1, wherein the first interfaces allow the first clients to connect to the first libraries.

6. The method of claim 1, wherein the first clients are configured to delegate tasks to the first libraries.

7. The method of claim 1, wherein the first functional elements comprise portions of compiler outputs.

8. The method of claim 1, wherein the first libraries are expressions of algorithms in automatable forms.

9. The method of claim 8, wherein an automatable form of the automatable forms comprises programming language source code, bytecode, or binary-executable code.

10. The method of claim 1, wherein the different programming languages comprise at least seven different programming languages.

11. The method of claim 1, wherein the different programming languages comprise at least seven different programming languages selected from the group consisting of C, JAVA, PYTHON, C++, C#, JAVASCRIPT, PHP, SWIFT, R, LISP, FORTRAN, ADA, PASCAL, GROOVY, RUBY, GO, OBJECTIVE-C, DART, SCALA, and LUA.

12. The method of claim 1, wherein the source code files in the different programming languages are generated by the automatic interface generator from the first common specification.

13. The method of claim 1, wherein the metadata comprises a name for a particular definitional element of the subset of definitional elements of the first definitional elements, the name for the particular definitional element generated by the automatic interface generator based on a model of a human language.

14. A non-transitory storage media storing instructions which, when executed by one or more processors, causes the one or more processors to perform operations comprising:

generating, by an automatic interface generator, first interfaces for first libraries from a first common specification, the first interfaces comprising first interface definitions, the first interface definitions comprising first definitional elements in different programming languages, the first definitional elements allowing use of first functional elements of the first libraries by first clients;

examining the first clients of the first libraries to determine a subset of functional elements of the first functional elements that will be used by the first clients, wherein examining the first clients of the first libraries to determine the subset of functional elements of the first functional elements that are actually used by the first clients comprises scanning source code files in the different programming languages to determine the subset of definitional elements of the first definitional elements that allow use by the first clients of the subset of functional elements of the first functional elements; and outputting metadata indicating a subset of definitional elements of the first definitional elements that allow use by the first clients of the subset of functional elements of the first functional elements.

15. The non-transitory storage media of claim 14, further storing instructions which, when executed by the one or more processors, causes the one or more processors to perform operations comprising:

generating, by the automatic interface generator, second interfaces for second libraries from a second common specification, the second interfaces comprising second interface definitions, the second interface definitions comprising second definitional elements in the different programming languages, the second definitional elements allowing use of second functional elements of the second libraries by the first clients; and wherein generating the second interfaces comprises the automatic interface generator using the metadata to verify that the second definitional elements comprise the subset of definitional elements of the first definitional elements that allow use by the first clients of the subset of functional elements of the first functional elements.

16. A system comprising:

memory;

one or more computing processors;

instructions stored in the memory which, when executed by the system, cause the system to:

generate first interfaces for first libraries from a first common specification, the first interfaces comprising first interface definitions, the first interface definitions comprising first definitional elements in different programming languages, the first definitional elements allowing use of first functional elements of the first libraries by first clients;

examine the first clients of the first libraries to determine a subset of functional elements of the first functional elements that will be used or that are actually used by the first clients;

prompt for user input to resolve a naming conflict for a particular definitional element of a subset of definitional elements of the first definitional elements; and output metadata indicating the subset of definitional elements of the first definitional elements that allow use by the first clients of the subset of functional elements of the first functional elements, wherein the metadata comprises a name for the particular definitional element of the subset of definitional elements of the first definitional elements, the name resulting from resolution of the naming conflict.

17. The system of claim 16, further comprising instructions stored in the memory which, when executed by the system, cause the system to:

generate second interfaces for second libraries from a second common specification, the second interfaces comprising second interface definitions, the second interface definitions comprising second definitional elements in the different programming languages, the second definitional elements allowing use of second functional elements of the second libraries by the first clients; and use the metadata to verify that the second definitional elements comprise the subset of definitional elements of the first definitional elements that allow use by the first clients of the subset of functional elements of the first functional elements.

18. The system of claim 16, further comprising instructions stored in the memory which, when executed by the system, cause the system to:

fetch the metadata from a common module repository.

\* \* \* \* \*